United States Patent
Nussinson et al.

(10) Patent No.: US 12,254,176 B1
(45) Date of Patent: Mar. 18, 2025

(54) SYSTEM AND METHOD OF TAP DETECTION ON A THREE-DIMENSIONAL IMAGE

(71) Applicant: Apple Inc., Cupertino, CA (US)

(72) Inventors: Dan Nussinson, Haifa (IL); Yoed Arieli, Jerusalem (IL); Jonathan Hauser, Ramat Gan (IL); Oriel Y. Bergig, Shoham (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/472,705

(22) Filed: Sep. 22, 2023

Related U.S. Application Data

(60) Provisional application No. 63/376,891, filed on Sep. 23, 2022.

(51) Int. Cl.
G06F 3/04886 (2022.01)
G06F 3/043 (2006.01)
G06F 3/04815 (2022.01)

(52) U.S. Cl.
CPC .......... *G06F 3/04886* (2013.01); *G06F 3/043* (2013.01); *G06F 3/04815* (2013.01)

(58) Field of Classification Search
None
See application file for complete search history.

(56) References Cited

U.S. PATENT DOCUMENTS

| | | | |
|---|---|---|---|
| 2010/0103137 A1* | 4/2010 | Ciesla | G06F 3/04895 345/174 |
| 2010/0302155 A1* | 12/2010 | Sands | G06F 3/04886 345/173 |
| 2011/0078613 A1* | 3/2011 | Bangalore | G06F 1/1684 345/169 |
| 2017/0228128 A1* | 8/2017 | Lawrenson | G06F 3/04883 |
| 2018/0164849 A1* | 6/2018 | Chan | A42B 3/042 |

OTHER PUBLICATIONS

"Researchers make virtual keyboard a reality", Greater Zurich [online]. Mar. 17, 2021, [retrieved on Dec. 1, 2023]. Retrieved from the Internet: <URL: https://www.greaterzuricharea.com/en/news/researchers-make-virtual-keyboard-reality>.

(Continued)

*Primary Examiner* — Nicholas J Lee

(74) *Attorney, Agent, or Firm* — Kubota & Basol LLP

(57) ABSTRACT

In some examples, an electronic device may be in communication with one or more input devices, including a camera, and a remote sensing vibrometer. In some examples, the remote sensing vibrometer may be configurable to emit, using a light source, one or more light beams that are incident on the physical surface on which the virtual image is displayed. In some examples, the remote sensing vibrometer detects contact with the physical surface based on one or more vibrations in the physical surface that are detected using the one or more light beams. In some examples, when the physical object contacts the physical surface on which the virtual image is displayed, the electronic device determines a location of the contact relative to the virtual image on the physical surface based on the detected vibrations produced by the contact of the physical object on the physical surface in the computer-generated environment.

20 Claims, 16 Drawing Sheets

(56) References Cited

OTHER PUBLICATIONS

Yang, C. et al. "Multi-point laser coherent detection system and its applications in experimental mechanics", Proc. SPIE 8769 [online]. International Conference on Optics in Precision Engineering and Nanotechnology (icOPEN2013), 2013 [retrieved on Dec. 1, 2023]. Retrieved from the Internet: <URL: https://www.spiedigitallibrary.org/conference-proceedings-of-spie/8769/1/Multi-point-laser-coherent-detection-system-and-its-applications-in/10.1117/12.2016664.short> <DOI: https://doi.org/10.1117/12.2016664>.

Meier, Manuel et al. "TapID: Rapid Touch Interaction in Virtual Reality using Wearable Sensing", IEEE Virtual Reality and 3D User Interfaces (VR 2021) [online], Mar. 27-Apr. 2, 2021, pp. 519-528 [retrieved on Apr. 25, 2024]. Retrieved from the Internet: <URL: https://www.research-collection.ethz.ch/handle/20.500.11850/488237> <DOI: https://doi.org/10.3929/ethz-b-000488237>.

* cited by examiner

SYSTEM AND METHOD OF TAP DETECTION ON A THREE-DIMENSIONAL IMAGE

CROSS-REFERENCE TO RELATED APPLICATIONS

This application claims the benefit of U.S. Provisional Application No. 63/376,891, filed Sep. 23, 2022, the content of which is herein incorporated by reference in its entirety for all purposes.

FIELD OF THE DISCLOSURE

This relates generally to systems and methods of tap detection on a three-dimensional image.

BACKGROUND OF THE DISCLOSURE

Some computer graphical environments provide two-dimensional and/or three-dimensional environments where at least some objects displayed for a user's viewing are virtual and generated by a computer. In some examples, the objects correspond to virtual images that include one or more selectable options, such as virtual affordances or options in a user interface, and that are presented on a physical surface of a physical environment surrounding the computer. In some uses, a user may select a selectable option of the virtual image by contacting (e.g., tapping) the physical surface at a location corresponding to the selectable option of the virtual image. In some examples, selecting the selectable option causes the computer to perform an operation in the three-dimensional environment. Systems and methods that allow for detection of input directed to a virtual image (e.g., a three-dimensional object including one or more selectable options) presented in three-dimensions are thus desirable.

SUMMARY OF THE DISCLOSURE

Some examples of the disclosure are directed to systems and methods for detecting input directed to a virtual image that is presented on a physical surface in a computer-generated environment. In some examples, an electronic device may be in communication with one or more input devices, including a camera, and a remote sensing vibrometer. In some examples, the remote sensing vibrometer may be configurable to emit, using a light source, one or more light beams that are incident on the physical surface on which the virtual image is displayed. In some examples, the remote sensing vibrometer detects contact with the physical surface based on one or more vibrations in the physical surface that are detected using the one or more light beams. In some examples, the electronic device is configurable to track, using images captured via the camera, movement of a physical object relative to the virtual image on the physical surface and determine a location of the physical object relative to the virtual image. In some examples, when the physical object contacts the physical surface on which the virtual image is displayed, the electronic device determines a location of the contact relative to the virtual image on the physical surface based on the determined location of the physical object and the detected vibrations produced by the contact of the physical object on the physical surface in the computer-generated environment. In some examples, the electronic device determines that the contact of the physical object on the physical surface corresponds to a selection input directed to the virtual image based on the determined location of the contact relative to the virtual image.

In some examples, the virtual image includes a virtual keyboard that includes a plurality of selectable keys, and the physical object corresponds to a hand of a user of the electronic device. In some examples, if the electronic device determines that the selection input provided by the hand of the user is directed to a key of the virtual keyboard, the electronic device performs a selection directed to the key. In some examples, when the electronic device performs the selection, the electronic device performs an operation based on the selected key. In some examples, performing the operation includes entering a character corresponding to the selected key into a virtual text-entry field displayed in the computer-generated environment. In some examples, performing the operation includes entering a space into the text-entry field displayed in the computer-generated environment. In some examples, performing the operation includes deleting a character from existing text in the text-entry field that is displayed in the computer-generated environment. In some examples, if the electronic device determines that the location of the contact provided by the hand of the user does not correspond to a selectable key of the virtual keyboard, the electronic device forgoes performing a selection directed to a selectable key of the virtual keyboard.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
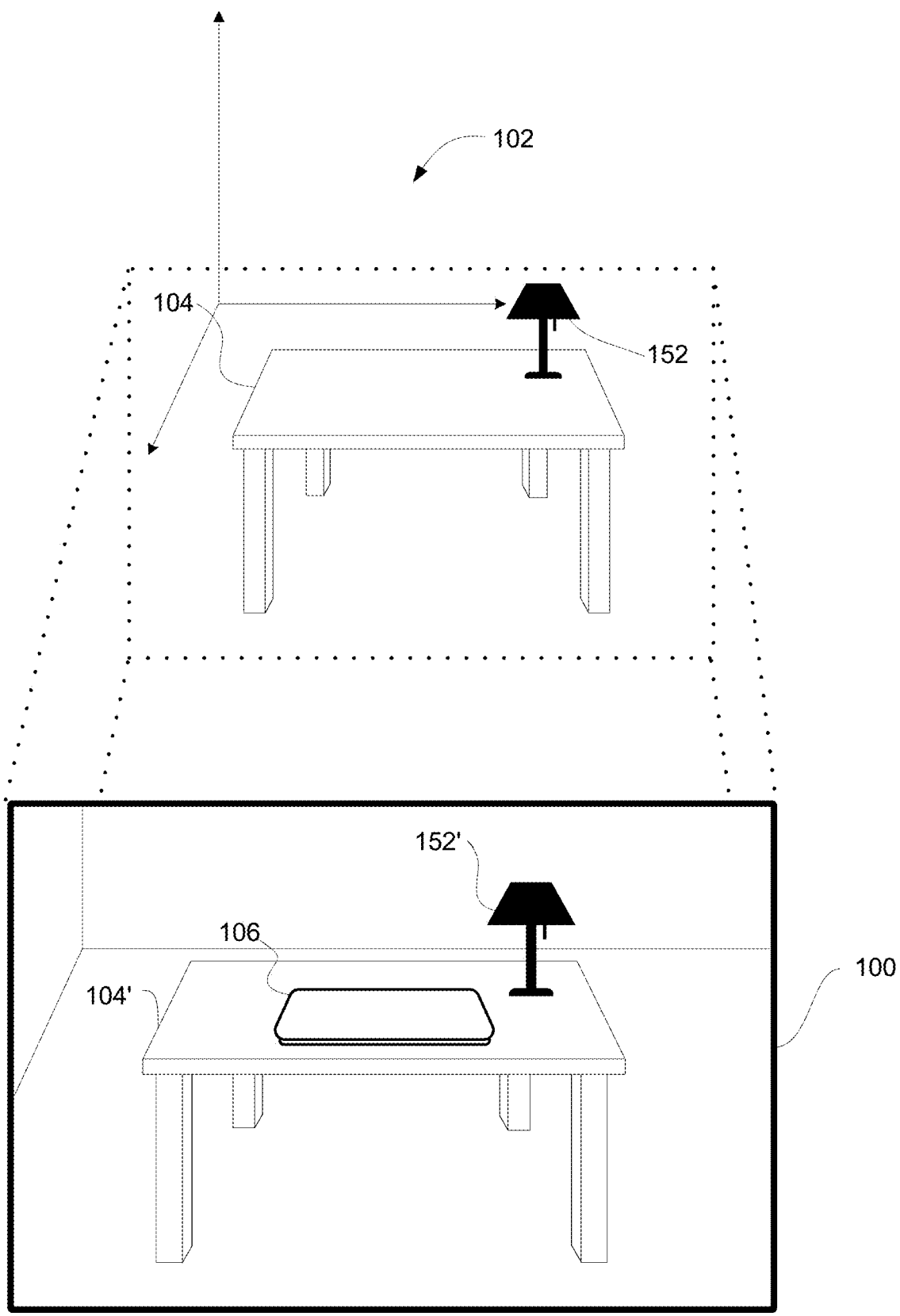
FIG. 1 illustrates an electronic device displaying an extended reality environment according to some examples of the disclosure.

A physical environment refers to a physical world with which people can interact and/or sense without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment ("extended reality environment," "computer generated environment") refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. As another example, the XR system may detect an interaction (e.g., a (virtual) touch, tap, pinch, etc.) with one or more objects in the XR environment, and, in response, adjust and/or update graphical content presented to the user in a manner similar to how such objects or views of such objects would change in a physical environment. In some examples, the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems (including hologram-based systems), heads-up displays (HUDs), head mounted displays (HMDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Some examples of the disclosure are directed to systems and methods for detecting input directed to a virtual image that is presented on a physical surface in a computer-generated environment. In some examples, an electronic device may be in communication with one or more input devices, including a camera, and a remote sensing vibrometer. In some examples, the remote sensing vibrometer may be configurable to emit, using a light source, one or more light beams that are incident on the physical surface on which the virtual image is displayed. In some examples, the remote sensing vibrometer detects contact with the physical surface based on one or more vibrations in the physical surface that are detected using the one or more light beams. In some examples, the electronic device is configurable to track, using images captured via the camera, movement of a physical object relative to the virtual image on the physical surface and determine a location of the physical object relative to the virtual image. In some examples, when the physical object contacts the physical surface on which the virtual image is displayed, the electronic device determines a location of the contact relative to the virtual image on the physical surface based on the determined location of the physical object and the detected vibrations produced by the contact of the physical object on the physical surface in the computer-generated environment. In some examples, the electronic device determines that the contact of the physical object on the physical surface corresponds to a selection input directed to the virtual image based on the determined location of the contact relative to the virtual image.

In some examples, the virtual image includes a virtual keyboard that includes a plurality of selectable keys, and the physical object corresponds to a hand of a user of the electronic device. In some examples, if the electronic device determines that the selection input provided by the hand of the user is directed to a key of the virtual keyboard, the electronic device performs a selection directed to the key. In some examples, when the electronic device performs the selection, the electronic device performs an operation based on the selected key. In some examples, performing the operation includes entering a character corresponding to the selected key into a virtual text-entry field displayed in the computer-generated environment. In some examples, performing the operation includes entering a space into the text-entry field displayed in the computer-generated environment. In some examples, performing the operation includes deleting a character from existing text in the text-entry field that is displayed in the computer-generated environment. In some examples, if the electronic device determines that the location of the contact provided by the hand of the user does not correspond to a selectable key of the virtual keyboard, the electronic device forgoes performing a selection directed to a selectable key of the virtual keyboard.

In some examples, interacting with the virtual keyboard in the three-dimensional environment may include tracking a gaze of the user of the electronic device. In some examples, a user's gaze may be tracked by the electronic device as an input for targeting and/or selecting the virtual keyboard within the three-dimensional environment. For example, gaze can be used to identify one or more keys of the virtual keyboard targeted for selection using another selection input, or select a virtual key when gaze is maintained for a threshold period of time. In some examples, a virtual key of the virtual keyboard may be selected using hand-tracking input detected via a first input device in communication with the electronic device.

FIG. 1 illustrates an electronic device 100 displaying an extended reality (XR) environment (e.g., a computer-generated environment) according to some examples of the disclosure. In some examples, electronic device 100 is a hand-held or mobile device, such as a tablet computer, laptop computer, smartphone, or head-mounted display.

Examples of device 100 are described below with reference to the architecture block diagram of FIG. 2. As shown in FIG. 1, electronic device 100 and table 104 are located in the physical environment 102. In some examples, electronic device 100 may be configured to capture areas of physical environment 102 including table 104 and lamp 152 (illustrated in the field of view of electronic device 100). In some examples, in response to a trigger, the electronic device 100 may be configured to display a virtual object 106 in the computer-generated environment (e.g., represented by a table illustrated in FIG. 1) that is not present in the physical environment 102, but is displayed in the computer-generated environment positioned on (e.g., anchored to) the top of a computer-generated representation 104' of real-world table 104. For example, virtual object/image 106 can be displayed on the surface of the table 104' in the computer-generated environment displayed via device 100 in response to detecting the planar surface of table 104 in the physical environment 102.

In some examples, the virtual image 106 is a virtual keyboard displayed on the surface of the table 104 in the physical environment 102. In some examples, the virtual image (e.g., virtual keyboard) 106 is displayed upon the planar surface of the table 104, such that the virtual image has a (e.g., substantially) horizontal (e.g., flat) orientation in the computer-generated environment. It should be understood that virtual object 106 is a representative virtual object and one or more different virtual objects (e.g., of various dimensionality such as two-dimensional or three-dimensional virtual objects) can be included and rendered in a three-dimensional computer-generated environment. For example, the virtual object can represent an application, or a user interface displayed in the computer-generated environment. In some examples, the virtual object 106 is optionally configured to be interactive and responsive to user input, such that a user may virtually touch, tap, move, rotate, or otherwise interact with, the virtual object. Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component, one or more input devices, and a remote sensing vibrometer is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e mail application, an instant messaging application, a workout support application, a photo management application, a digital camera application, a digital video camera application, a web browsing application, a digital music player application, a television channel browsing application, and/or a digital video player application.

Figure 2:
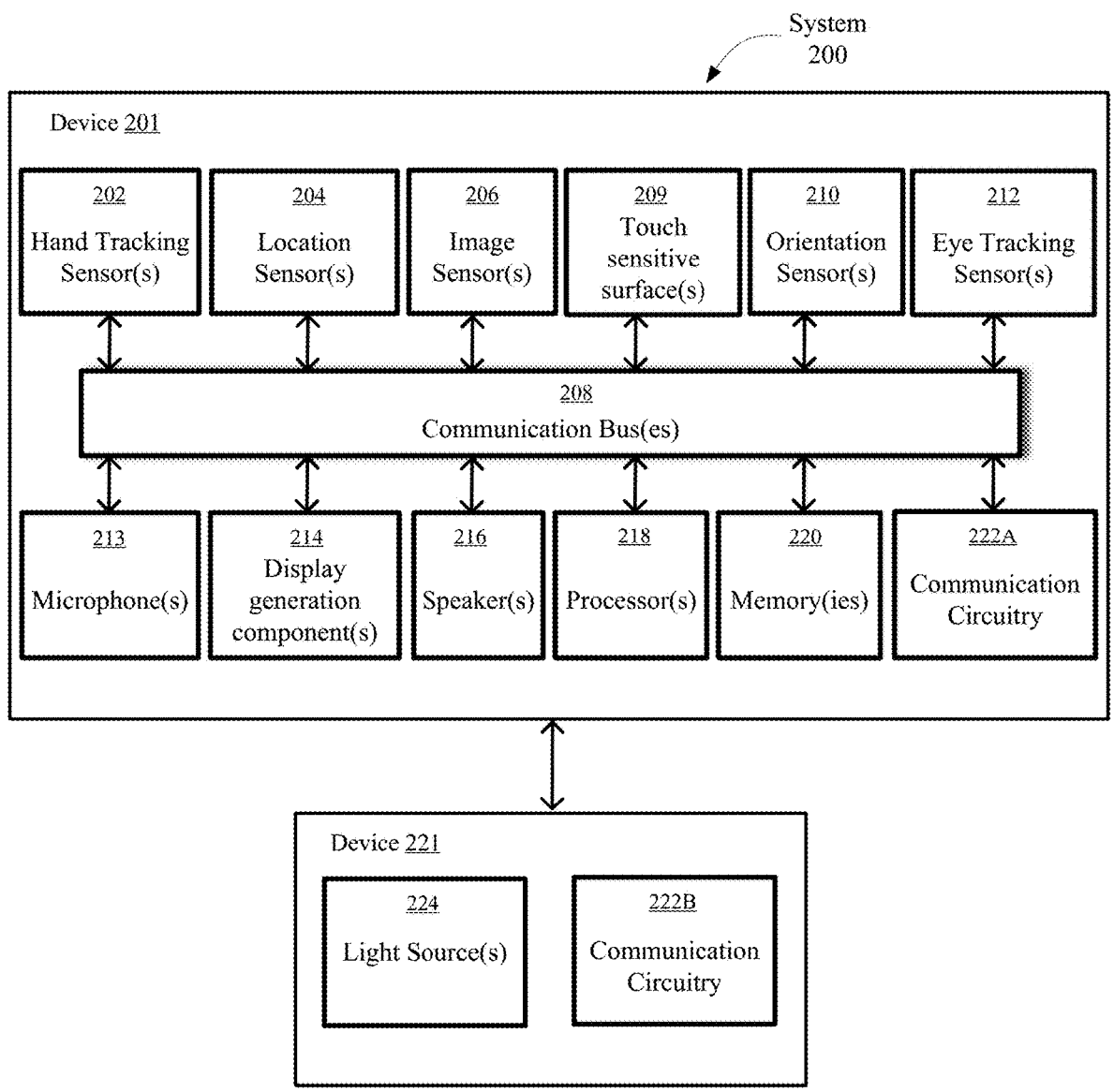
FIG. 2 illustrates a block diagram of an exemplary architecture for a system or device according to some examples of the disclosure.

FIG. 2 illustrates a block diagram of an exemplary architecture for a system or device 201 according to some examples of the disclosure. In some examples, system 200 includes a first device 201 that is in communication with a second device 221. In some examples, device 201 is a portable device, such as a mobile phone, smart phone, a tablet computer, a laptop computer, an auxiliary device in communication with another device, etc. As illustrated in FIG. 2, device 201 optionally includes various sensors (e.g., one or more hand tracking sensor(s) 202, one or more location sensor(s) 204, one or more image sensor(s) 206, one or more touch-sensitive surface(s) 209, one or more motion and/or orientation sensor(s) 210, one or more eye tracking sensor(s) 212, one or more microphone(s) 213 or other audio sensors, etc.), one or more display(s) 214, one or more speaker(s) 216, one or more processor(s) 218, one or more memories 220, and/or communication circuitry 222A. One or more communication buses 208 are optionally used for communication between the above-mentioned components of device 201. Additionally, as shown in FIG. 2, device 221 optionally includes one or more light source(s) 224 and/or communication circuitry 222B.

Communication circuitry 222A/222B optionally includes circuitry for communicating with electronic devices, networks, such as the Internet, intranets, a wired network and/or a wireless network, cellular networks and wireless local area networks (LANs). Communication circuitry 222A/222B optionally includes circuitry for communicating using near-field communication (NFC) and/or short-range communication, such as Bluetooth®. In some examples, as described in more detail below, the communication circuitry 222A of the electronic device 201 is configured to communicate with the communication circuitry 222B of the electronic device 221. In some examples, the electronic device 201 and the electronic device 221 are configured to exchange data and other information via the communication circuitry 222A/222B.

Processor(s) 218 optionally include one or more general purpose processors, one or more graphics processors, and/or one or more digital signal processors (DSPs). In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memories 220 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display(s) 214 optionally include a single display (e.g., a liquid-crystal display (LCD), organic light-emitting diode (OLED), or other types of display). In some examples, display(s) 214 include multiple displays. In some examples, display(s) 214 includes a display with a touch-sensitive surface (e.g., a touch screen), a projector, a holographic projector, a retinal projector, etc.

In some examples, device 201 includes touch-sensitive surface(s) 209 configured to receive user inputs (touch and/or proximity inputs), such as tap inputs and swipe inputs or other gestures. In some examples, display(s) 214 and touch-sensitive surface(s) 209 together form touch-sensitive display(s) (e.g., a touch screen integrated with device 201 or external to device 201 that is in communication with device 201).

Image sensors(s) 206 optionally include one or more visible light image sensor, such as charged coupled device (CCD) sensors, and/or complementary metal-oxide-semiconductor (CMOS) sensors operable to obtain images of physical objects from the real-world environment. Image sensor(s) 206 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 206 optionally include one or more cameras configured to capture movement of physical objects in the real-world environment. Image sensor(s) 206 optionally include one or more depth sensors configured to detect the distance of physical objects from device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment. In some examples, the image sensor(s) include one or more cameras that are configured to track and model a hand of a user of the electronic device 201, including one or more fingers of the hand of the user. In some examples, as described in more detail later, the one or more cameras in communication with the electronic device 201 are configured to detect locations of the fingers of the hand of the user relative to a physical object in the physical environment surrounding the electronic device 201.

In some examples, device 201 uses CCD sensors, event cameras, and depth sensors in combination to detect the physical environment around device 201. In some examples, image sensor(s) 206 include a first image sensor and a second image sensor. The first image sensor and the second image sensor work together and are optionally configured to capture different information of physical objects in the real-world environment. In some examples, the first image sensor is a visible light image sensor, and the second image sensor is a depth sensor. In some examples, device 201 uses image sensor(s) 206 to detect the position and orientation of device 201 and/or display generation component(s) 214 in the real-world environment. For example, device 201 uses image sensor(s) 206 to track the position and orientation of display(s) 214 relative to one or more fixed objects in the real-world environment.

In some examples, device 201 optionally includes hand tracking sensor(s) 202 and/or eye tracking sensor(s) 212. Hand tracking sensor(s) 202 are configured to track the position/location of a user's hands and/or fingers, and/or motions of the user's hands and/or fingers with respect to the computer-generated environment, relative to the display(s) 214, and/or relative to another coordinate system. Eye tracking sensor(s) 212 are configured to track the position and movement of a user's gaze (eyes, face, or head, more generally) with respect to the real-world or computer-generated environment and/or relative to the display generation component(s) 214. In some examples, hand tracking sensor(s) 202 and/or eye tracking sensor(s) 212 are implemented together with the display(s) 214 (e.g., in the same device). In some examples, the hand tracking sensor(s) 202 and/or eye tracking sensor(s) 212 are implemented separate from the display(s) 214 (e.g., in a different device).

In some examples, the hand tracking sensor(s) 202 uses image sensor(s) 206 (e.g., one or more IR cameras, 3D cameras, depth cameras, etc.) that capture three-dimensional information from the real world including one or more hands. In some examples, the hands can be resolved with sufficient resolution to distinguish fingers and their respective positions. In some examples, one or more image sensor(s) 206 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device and using image sensors allows for tracking without requiring the user to wear a beacon or sensor, etc. on the hands/fingers.

In some examples, eye tracking sensor(s) 212 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and gaze can be determined from tracking both eyes. In some examples, one eye (e.g., a dominant eye) is tracked by a respective eye tracking camera/illumination source(s).

Device 201 optionally includes microphones(s) 213 or other audio sensors. Device 201 uses microphone(s) 213 to detect sound from the user and/or the real-world environment of the user. In some examples, microphone(s) 213 includes an array of microphones that optionally operate together (e.g., to identify ambient noise or to locate the source of sound in space of the real-world environment).

Device 201 optionally includes location sensor(s) 204 configured to detect a location of device 201 and/or of display(s) 214. For example, location sensor(s) 204 optionally includes a GPS receiver that receives data from one or more satellites and allows device 201 to determine the device's absolute position in the physical world.

Device 201 optionally includes motion and/or orientation sensor(s) 210 configured to detect orientation and/or movement of device 201 and/or display generation component(s) 214. For example, device 201 uses orientation sensor(s) 210 to track changes in the position and/or orientation of device 201 and/or display(s) 214 (e.g., with respect to physical objects in the real-world environment). Orientation sensor(s) 210 optionally include one or more gyroscopes, one or more accelerometers, and/or one or more inertial measurement units (IMUs).

Device 221 is optionally a remote sensing vibrometer. In some examples, the device 221 includes one or more light sources 224, which are optionally laser light sources. For examples, the one or more light sources 224 include a coherent laser source. In some examples, as described in more detail below, the one or more light sources 224 are configured to emit one or more light beams, such as laser beams, that can be incident upon a surface in the physical environment surrounding the device 221 and/or the device 201. For example, the one or more light sources 224 may be incident on a top surface of table 104 in FIG. 1. In some examples, the device 221 may be configurable to detect one or more vibrations in a physical surface on which the one or more light beams are incident. For example, the device 221 is configured to detect one or more reflections of the one or more light beams (e.g., one or more reflections of the one or more laser beams) that are incident on the physical surface. In some examples, the one or more reflections of the one or more light beams may be produced in response to a contact with the physical surface, such as an object contacting the physical surface as discussed in more detail below. In some examples, as described herein, the device 221 may determine a location of the contact on the surface based on the one or more reflections (e.g., based on a time of arrival (and/or a time of flight) of the one or more reflections). In some examples, the remote sensing vibrometer may be realized using single spot illumination techniques, such as speckle interferometry, self-modulation interferometry, dual-beam interferometry, and/or flood illumination techniques, such as speckle contrast imaging. In some examples, as shown in FIG. 2, the device 221 also includes communication circuitry 222B. In some examples the communication circuitry 222B enables the device 221 to communicate with the device 201, such that detected locations of contacts with the physical surface can be communicated to the device 201 (e.g., for touch detection, as described in more detail below).

It is understood that the architecture of FIG. 2 is an example architecture, but that system 200 and devices 201 and 221 is not limited to the components and configuration of FIG. 2. For example, the system 200 and/or the devices 201 and 221 can include fewer, additional, or other components in the same or different configurations. Additionally, in some examples, the device 201 and the device 221 can be implemented into a single device, such that the device 221 is integrated with the device 201. A person using system 200, is optionally referred to herein as a user of the device. Attention is now directed towards exemplary interactions with a virtual image that is displayed on a physical surface in the computer-generated environment. As discussed below, a contact (e.g., a tap or touch) on the physical surface by an object (e.g., a finger of a hand of the user) may be detected by the device 221 (e.g., the remote sensing vibrometer) and the device 201 may perform an operation in response to detecting the contact and/or based on the detected location of the contact with the physical surface. For example, as described below, the device 201 may perform a selection operation on a virtual image based on the location of the contact detected on the physical surface in the computer-generated environment. In some examples, displaying the virtual image and performing the selection operation described below can be performed by processors 218 of the device 201.

Figure 3A:
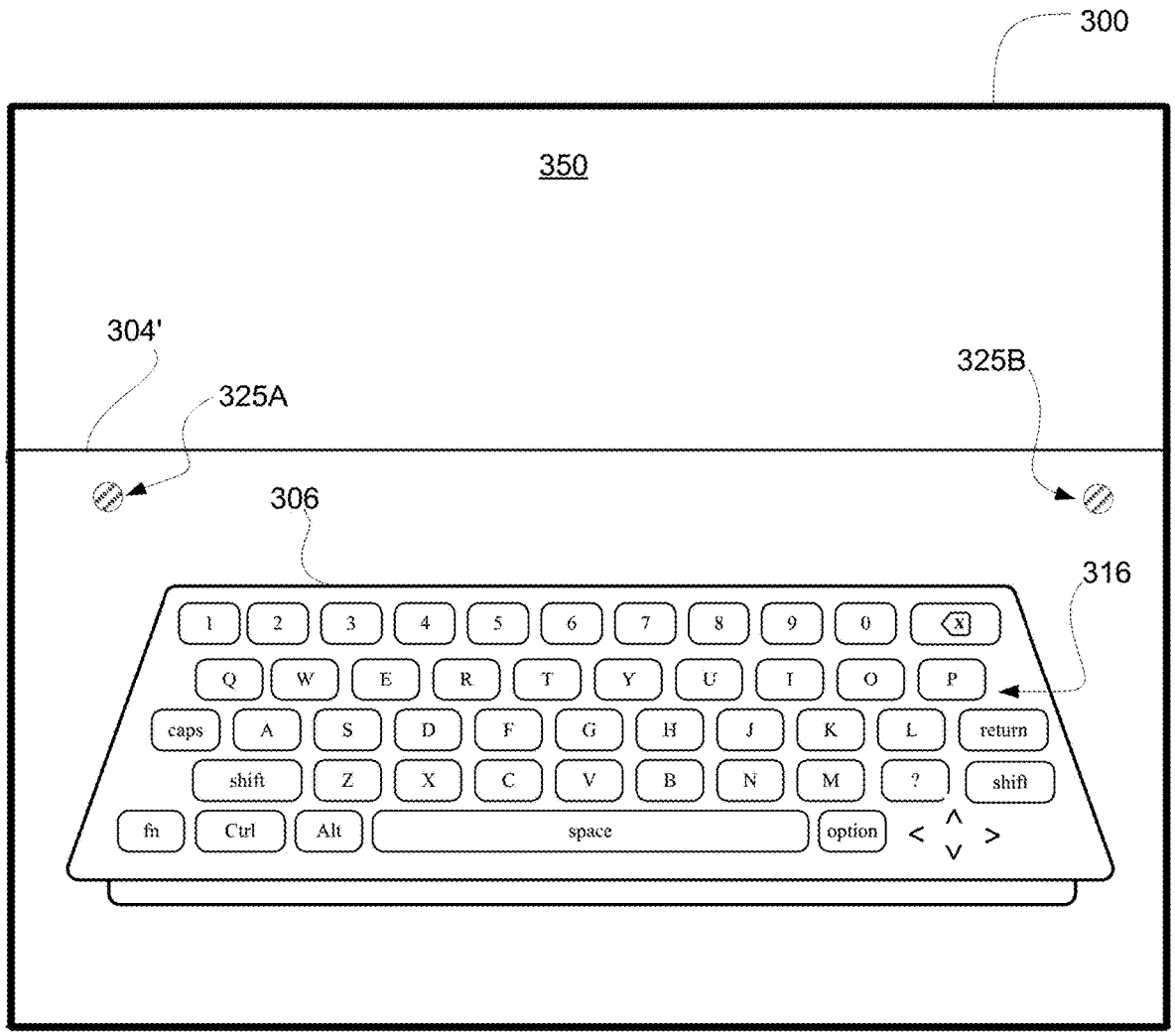
FIGS. 3A-3M illustrate example interactions with a virtual keyboard in a three-dimensional computer-generated environment according to some examples of the disclosure.
Figure 3B:
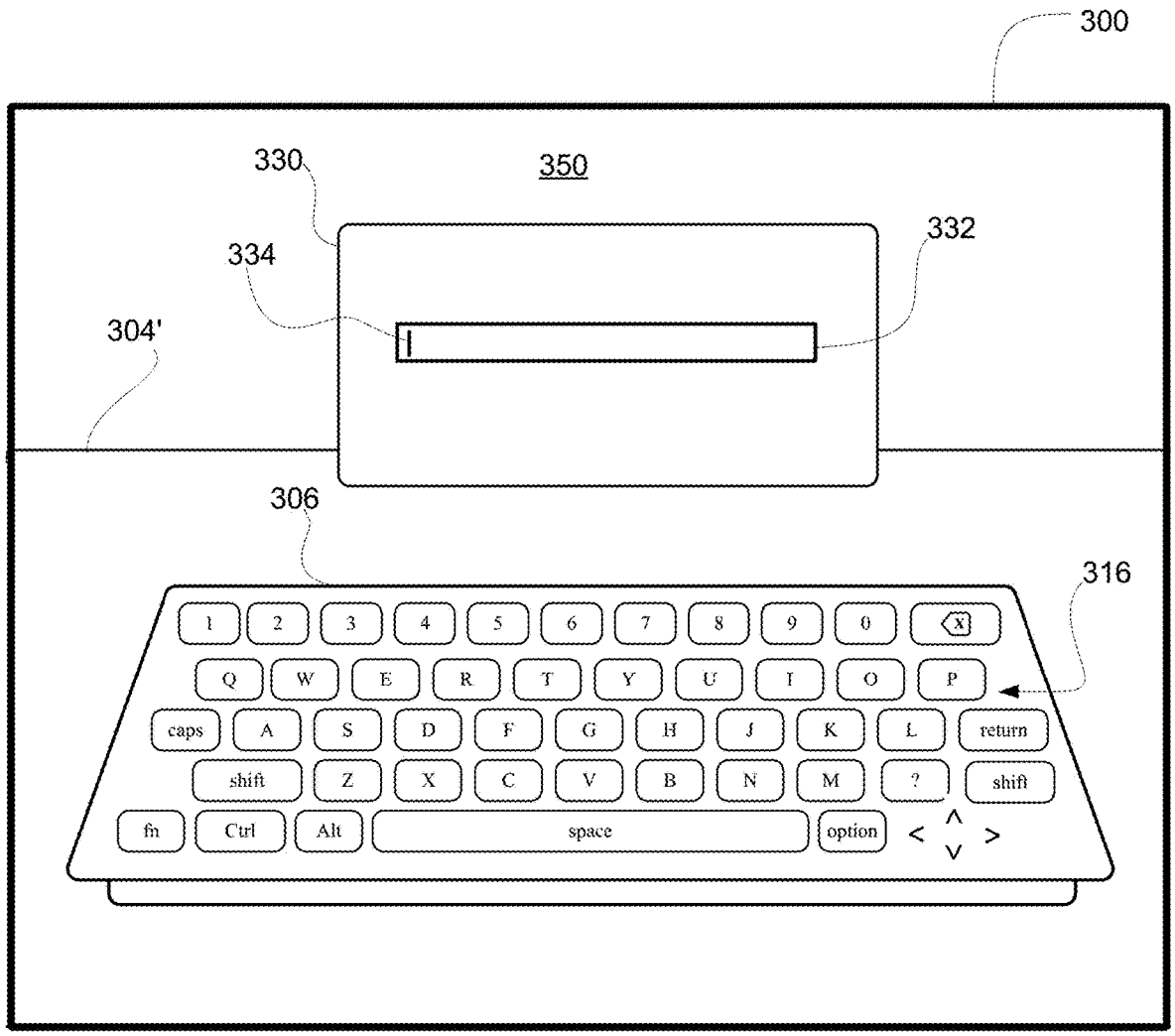

FIGS. 3A-3M illustrate example interactions with a virtual keyboard 306 in a three-dimensional computer-generated environment according to some examples of the disclosure. In some examples, the three-dimensional environment 350 may be presented using electronic device 300. The electronic device 300 may be similar to device 100 or 201, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses). In the example of FIGS. 3A-3M, the user is optionally wearing the electronic device 300, such that the three-dimensional environment 350 can be defined by X, Y and Z axes as viewed from a perspective of the electronic device (e.g., a viewpoint associated with the electronic device 300, which may be a head-mounted display, for example). For example, the physical environment includes a table, and the three-dimensional environment includes a representation of the table 304'. As shown in FIG. 3A, the three-dimensional environment may include virtual keyboard 306. In some examples, the virtual keyboard 306 may be displayed atop a surface of the table 304' in the three-dimensional environment 350, as similarly described above with reference to FIG. 1. In some examples, the virtual keyboard 306 includes a plurality of keys 316, as shown in FIG. 3A. For example, the plurality of keys 316 may be selectable to input text (e.g., comprising one or more characters) into a virtual text-entry field/region, as described in more detail below.

In some examples, the electronic device 300 may display the virtual keyboard 306 in three-dimensional environment 350 in response to a request to display the virtual keyboard 306 within a text-entry application running on the electronic device 300. For example, the user of the electronic device 300 may provide a request to display the virtual keyboard 306 in the three-dimensional environment 350 (e.g., by selecting one or more user interface elements) for inputting text (e.g., one or more characters, such as letters, numbers, punctuation marks, etc.) into a text-entry field of a user interface (e.g., a messaging user interface, a web-browsing user interface, a content-creation user interface, etc.). In response to receiving the request, the electronic device 300 may display the virtual keyboard 306 in three-dimensional environment 350. In some examples, as shown in FIG. 3A, the electronic device 300 displays the virtual keyboard 306 on the surface of the table 304' such that the virtual keyboard 306 is anchored to the surface of the table 304'.

In some examples, it may be advantageous to provide a method for detecting input directed to one or more keys of the plurality of keys 316 of the virtual keyboard 306 in the three-dimensional environment 350. For example, as mentioned above and as shown in FIG. 3B, the virtual keyboard 306 may be utilized to enter text into a text-entry field 332 of a text-entry user interface within application window 330. In some examples, a character (e.g., a letter, number, punctuation mark, etc.) may be entered into (e.g., displayed in) the text-entry field 332 (e.g., at a location of cursor 334) in response to an input selecting a respective key associated with the character on the virtual keyboard 306. In some examples, the input selecting the respective key may correspond to a tap input directed to the respective key of the virtual keyboard 306. Accordingly, providing a method for detecting a selection of one or more keys of the virtual keyboard 306 via physical tap input detected on the surface of the table 304' on which the virtual keyboard 306 is displayed in the three-dimensional environment 350 may be particularly useful for providing text input in the text-entry region 332 of the application window 330.

In some examples, as similarly described above with reference to FIG. 2, the electronic device 300 may be in communication with a remote sensing vibrometer (e.g., device 221 in FIG. 2). For example, in FIG. 3A, the electronic device 300 may include a remote sensing vibrometer that is configurable to emit one or more light beams (e.g., a predetermined number of light beams, such as 1, 2, 3, 4, 5, etc.), such as laser light beams, via a light source, such as a coherent laser light source. In some examples, the remote sensing vibrometer may be configurable to emit the one or more laser beams onto the surface of the table 304' in the three-dimensional environment 350. For example, as shown in FIG. 3A, the remote sensing vibrometer may be configurable to emit a first light beam that is incident on the physical surface of the table 304' at a first location 325A. Additionally, as shown in FIG. 3A, the remote sensing vibrometer may be configurable to emit a second light beam that is incident on the physical surface of the table 304' at a second location 325B. In some examples, the first location 325A and/or the second location 325B may be predetermined locations (e.g., selected by the electronic device 300) that enable the first light beam and/or the second light beam emitted by the remote sensing vibrometer to detects one or more vibrations in the table 304'. In some examples, the electronic device 300 may detect selection of one or more keys of the virtual keyboard 306 via one or more vibrations of the table 304' that are detected via the one or more light beams emitted by the remote sensing vibrometer. For example, a tap or similar input provided by an external object (e.g., a finger of a hand of the user of the electronic device 300) on the table 304' may produce one or more vibrations in the surface of the table 304' that are detected via the one or more light beams emitted by the remote sensing vibrometer (e.g., via one or more reflections of the one or more light beams). In some examples, the one or more detected vibrations in the surface of the table 304' on which the virtual keyboard 306 is displayed may be utilized by the electronic device 300 to localize the tap provided by the external object, and thus determine the virtual key of the virtual keyboard 306 intended for selection.

In some examples, as mentioned above with reference to FIG. 2, the remote sensing vibrometer may be separate from the electronic device 300. For example, one or more remote sensing vibrometers that are in communication with the electronic device 300 may be located at (e.g., placed/situated on) one or more corresponding locations in the three-dimensional environment, such as on the surface of the table 304'. As an example, the remote sensing vibrometer described above may be located at the first location 325A on the table 304' or at the second location 325B on the table 304'. In some such examples, the remote sensing vibrometer may include a light source that is configurable to emit one or more light beams that are incident on the surface of the table 304' (e.g., at locations different from the first location 325A and/or the second location 325B) and/or may include one or more vibration sensors that are configurable to detect vibrations in the surface of the table 304'.

Figure 3C:
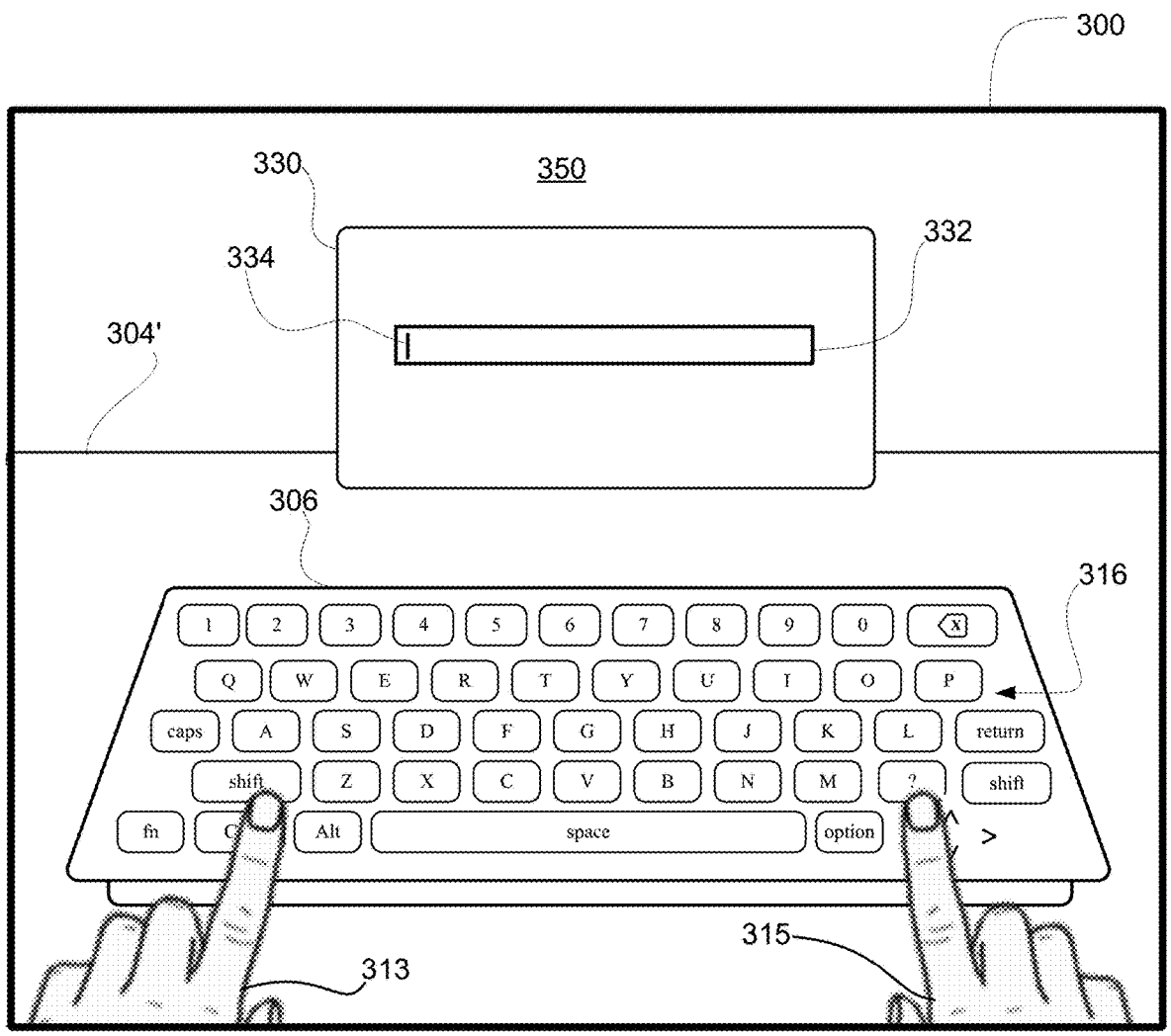

Additionally, in some examples, the electronic device 300 may determine the virtual key of the virtual keyboard 306 that is intended for selection based on images captured using a camera (e.g., hand tracking sensor(s) 202 and/or image sensor(s) 206 in FIG. 2) in communication with the electronic device 300. For example, the electronic device 300 may include a camera that is configurable to track movement of the external object (e.g., the finger(s) of the hand of the user) in the three-dimensional environment 350. As shown in FIG. 3C, the camera in communication with the electronic device 300 may locate and identify a location of a first hand 313 and a second hand 315 of the user relative to the virtual keyboard 306 displayed on the table 304'. In some examples, when the first hand 313 and/or the second hand 315 of the user move in the three-dimensional environment 350 toward the virtual keyboard 306 to select one or more keys of the virtual keyboard 306, the electronic device 300 may track the locations of the first hand 313 and/or the second hand 315 for determining a particular key of the virtual keyboard 306 that has been selected. For example, as discussed herein, the electronic device 300 may utilize the images of the hands 313 and/or 315 of the user that are captured via the camera in communication with the electronic device 300 to determine locations of the hands 313 and/or 315 relative to the virtual keyboard 306 and the vibrations of one or more taps on the surface of the table 304' provided by fingers of the hands 313 and/or 315 that are detected via the remote sensing vibrometer in communication with the electronic device 300 to detect selection of one or more keys 316 of the virtual keyboard 306. The electronic device 300 may track the movement of the fingers of the hands 313 and/or 315 of the user and detect the vibrations in the surface of the table 304' to determine that the user has selected a particular key of the virtual keyboard 306, as described in more detail below.

In some examples, the electronic device 300 may calibrate a sensitivity (e.g., vibrational sensitivity) of the surface of the table 304' on which the virtual keyboard 306 is presented in the three-dimensional environment 350. In some examples, determining the sensitivity of the surface of the table 304' may enable the electronic device 300 to determine one or more characteristics for controlling the emission of the one or more light beams of the remote sensing vibrometer discussed above. For example, determining the sensitivity of the surface of the table 304' may enable the electronic device 300 to determine a strength of the one or more light beams (e.g., a frequency at which the laser light beams are emitted) and/or a number of the one or more light beams (e.g., one, two, three, four, etc. laser light beams). In some examples, such characteristics may be selected based on the sensitivity of the physical surface to enable the electronic device 300 to efficiently detect selection input directed to the virtual keys 316 of the virtual keyboard 306 as discussed in detail below, which may improve power utilization of the electronic device 300. In some examples, calibrating the sensitivity may include prompting the user to provide preliminary input directed to the surface of the table 304' on which the virtual keyboard 306 is displayed. For example, the electronic device 300 may display a user interface object in the three-dimensional environment 350 that includes text instructing the user to tap the surface of the table 304' a predetermined number of times (e.g., one, two, three, etc. times). In some examples, the taps provided by the user (e.g., by the hand 313 or 315 of the user) may produce one or more vibrations in the surface of the table 304', as similarly described below, that are detected by the one or more light beams of the remote sensing vibrometer in communication with the electronic device 300. Based on a magnitude of the one or more vibrations detected using the remote sensing vibrometer (e.g., a number of the vibrations, an amplitude of the one or more vibrations, and/or a frequency of the one or more vibrations), the electronic device 300 may select the characteristics of the one or more light beams discussed above that are emitted by the remote sensing vibrometer for detecting selection input directed to the virtual keyboard 306, as discussed below. As an example, the sensitivity of a firm tabletop surface (e.g., such as table 304' in FIG. 3C) may be different from (e.g., less than) the sensitivity of a soft surface (e.g., a pillow surface, a carpet surface, a mattress surface, etc.), which may produce a fewer number of vibrations when the fingers of the user's hand contact the surface.

Figure 3D:
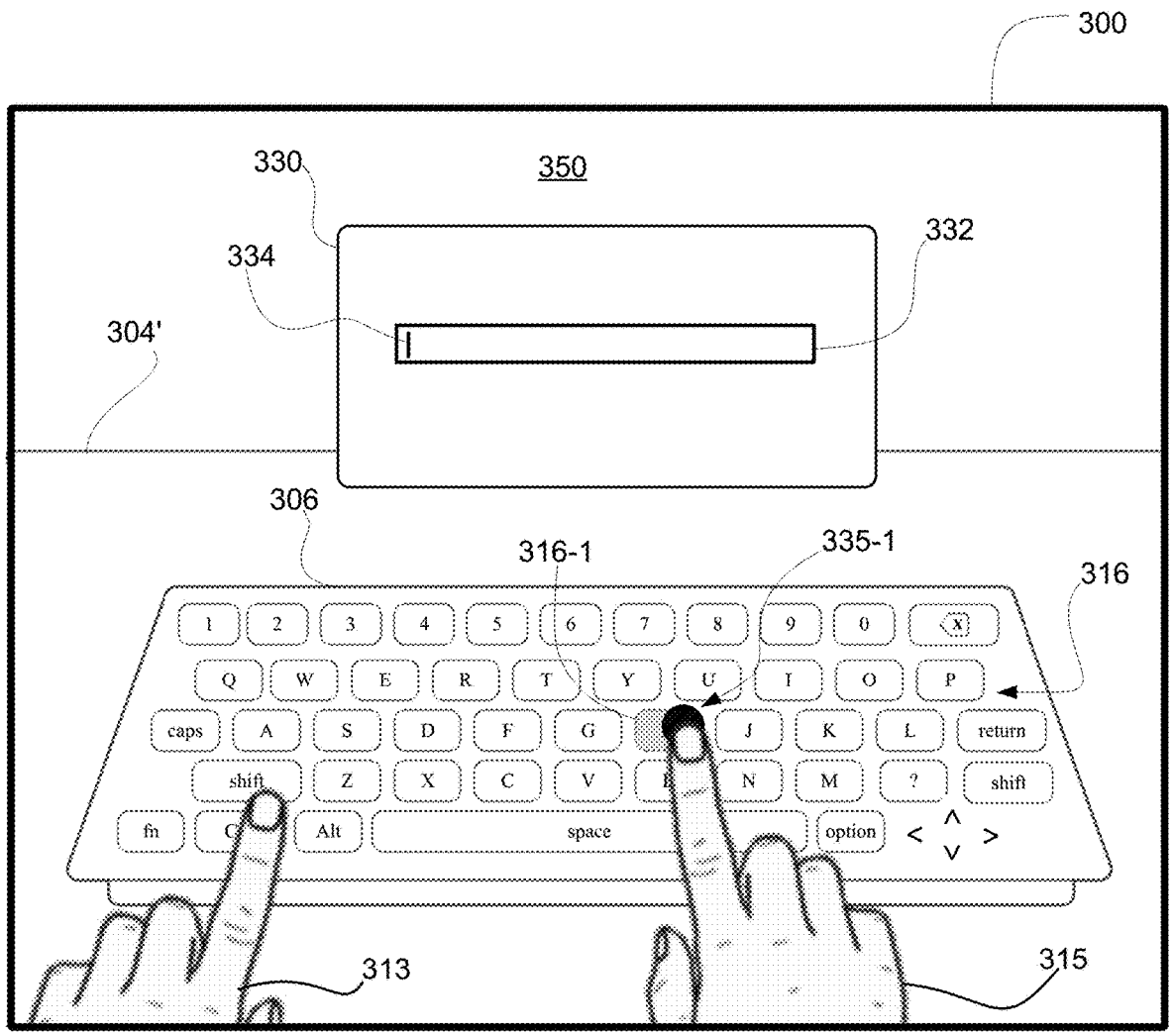

In some examples, as shown in FIG. 3D, the electronic device 300 may detect an input corresponding to a request to select a first key 316-1 of the virtual keyboard 306. For example, as shown in FIG. 3D, the electronic device 300 optionally detects movement of the second hand 315 toward the surface of the table 304' on which the virtual keyboard 306 is displayed in the three-dimensional environment 350. In some examples, the electronic device 300 detects a contact (e.g., a tap) on the surface of the table 304' provided by a finger of the second hand 315, as shown in FIG. 3D. For example, as similarly described above, the electronic device 300 detects one or more vibrations, represented by circle 335-1, in the surface of the table 304' (e.g., using the one or more laser light beams emitted by the remote sensing vibrometer) produced by the contact of the finger of the second hand 315 on the surface of the table 304'. In some examples, as discussed in more detail below, the electronic device 300 determines that the first key 316-1 of the virtual keyboard 306 has been selected based on the location of the second hand 315 relative to the virtual keyboard 306 and the locations of the one or more vibrations 335-1 produced by the contact of the finger of the second hand 315 on the surface of the table 304' in the three-dimensional environment 350.

Figure 3E:
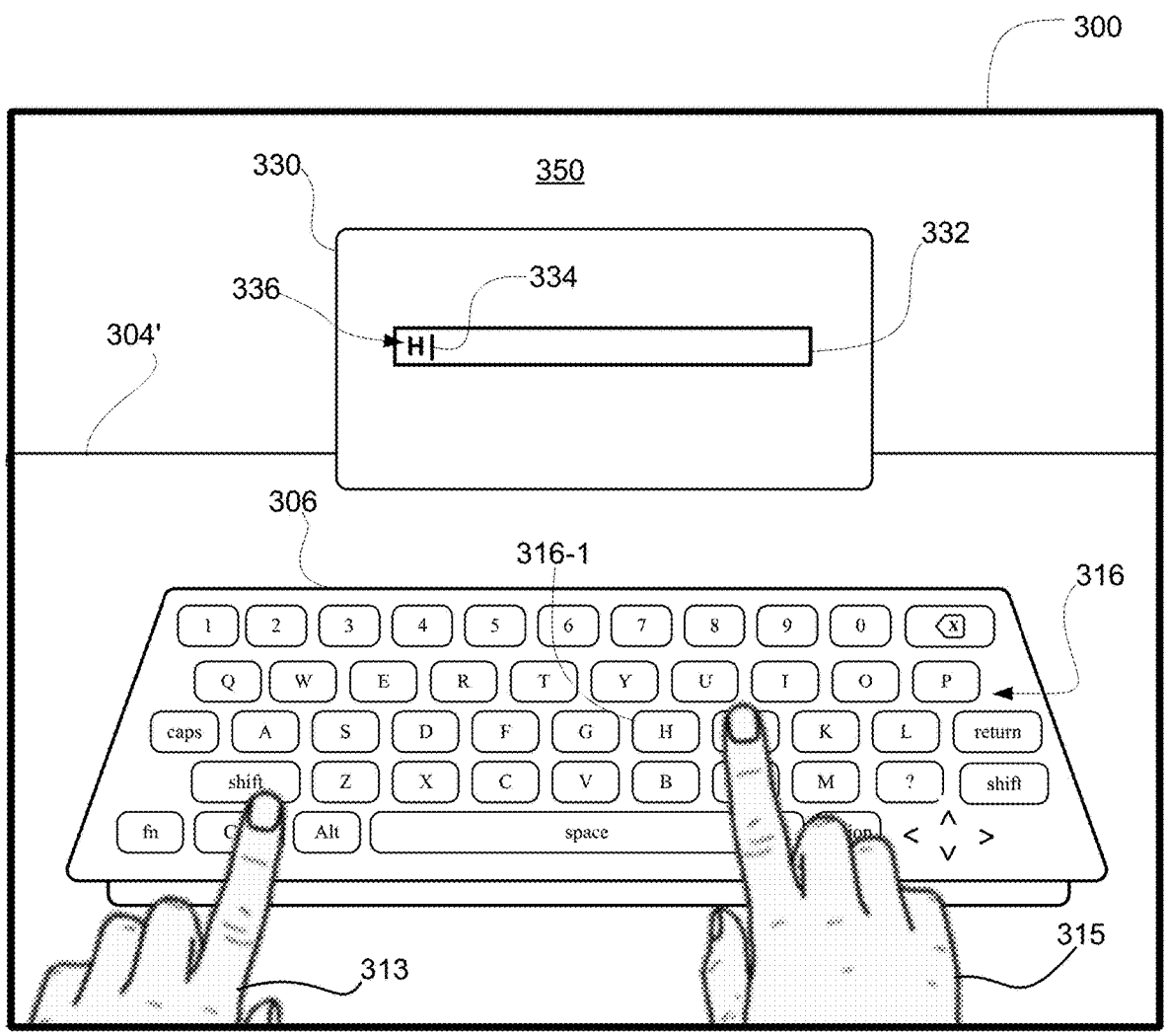

In some examples, as shown in FIG. 3E, the electronic device 300 determines that the contact provided by the finger of the second hand 315 of the user on the surface of the table 304' corresponds to a selection of the first key 316-1 of the virtual keyboard 306. For example, as similarly discussed above, the electronic device 300 determines that the location of the finger of the second hand 315 corresponds to (e.g., at least partially overlaps with) a location of the first key 316-1 of the virtual keyboard 306 on the surface of the table 304'. Further, in some examples, the electronic device 300 utilizes the one or more vibrations of the contact provided by the finger of the second hand 315 on the surface of the table 304' that are detected by the one or more laser light beams emitted by the remote sensing vibrometer to determine that the finger of the second hand 315 has contacted the surface of the table 304' and/or that locations of the one or more vibrations correspond to the location of the first key 316-1 of the virtual keyboard 306 on the surface of the table 304'. In some examples, in response to determining that the input provided by the second hand 315 of the user corresponds to a selection of the first key 316-1 of the virtual keyboard 306, the electronic device 300 enters a first character corresponding to the first key 316-1 in the text-entry field 332 of the application window 330. For example, as shown in FIG. 3E, the electronic device 300 displays text 336 that includes the character "H" that corresponds to the selected key 316-1 of the virtual keyboard 306 at the location of the cursor 334 in the text-entry region 332 in the application window 330. It should be understood that, in FIG. 3E, the second hand 315 of the user is optionally no longer in contact with the surface of the table 304' and that the first hand 313 is not providing input corresponding to a selection of a key of the virtual keyboard 306 when the input provided by the second hand 315 is detected.

Figure 3F:
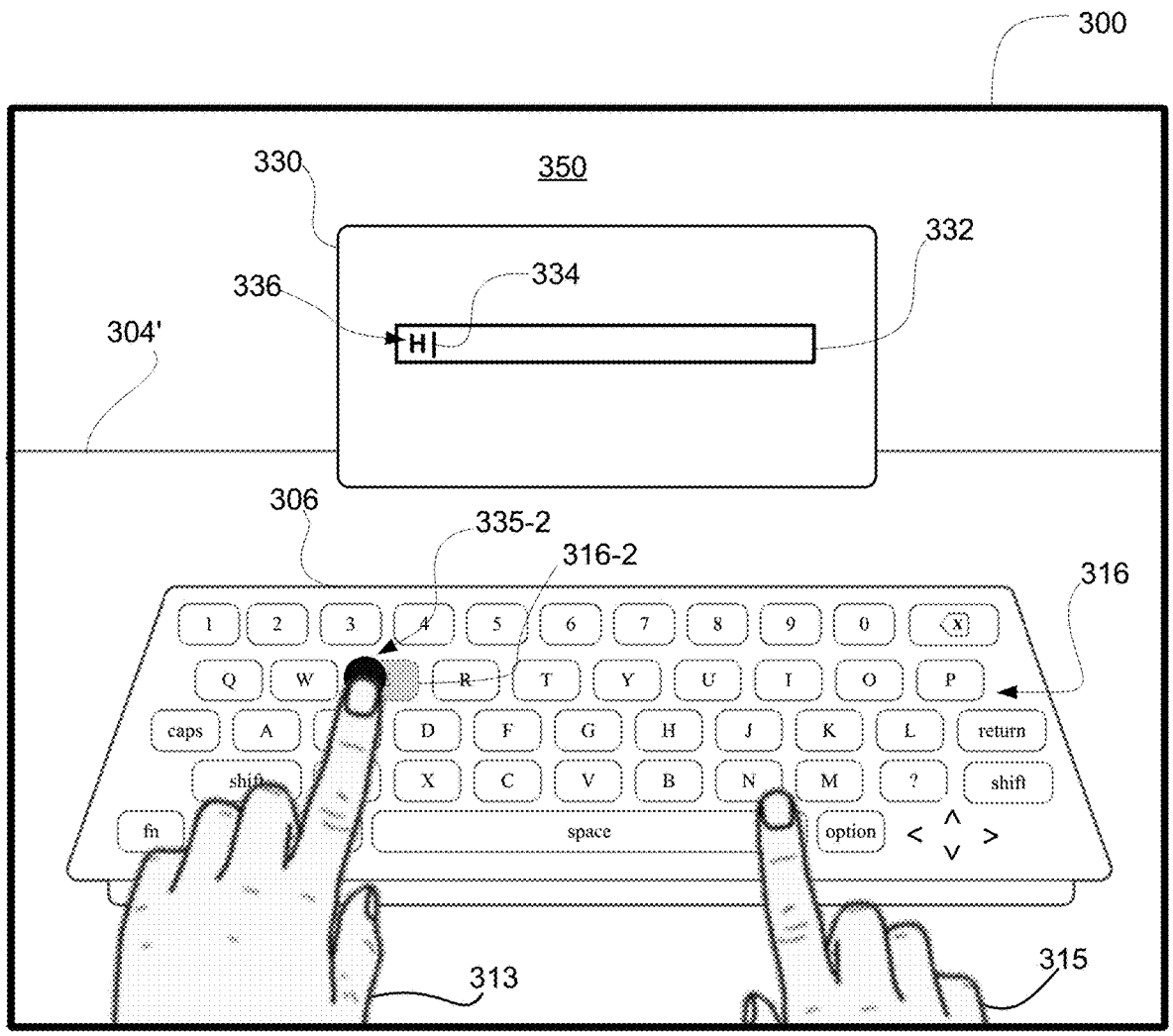

In some examples, in FIG. 3F, the electronic device 300 detects an input corresponding to a request to select a second key 316-2 of the virtual keyboard 306 in the three-dimensional environment 350. For example, as shown in FIG. 3F, the electronic device 300 optionally detects movement of the first hand 313 toward the surface of the table 304' on which the virtual keyboard 306 is displayed in the three-dimensional environment 350. In some examples, the electronic device 300 detects a contact (e.g., a tap) on the surface of the table 304' provided by a finger of the first hand 313, as shown in FIG. 3F. For example, as similarly described above, the electronic device 300 detects one or more vibrations, represented by circle 335-2, in the surface of the table 304' (e.g., using the one or more laser light beams emitted by the remote sensing vibrometer) produced by the contact of the finger of the first hand 313 on the surface of the table 304'. In some examples, as discussed in more detail below, the electronic device 300 determines that the second key 316-2 of the virtual keyboard 306 has been selected based on the location of the first hand 313 relative to the virtual keyboard 306 and the locations of the one or more vibrations 335-2 produced by the contact of the finger of the first hand 313 on the surface of the table 304' in the three-dimensional environment 350.

Figure 3G:
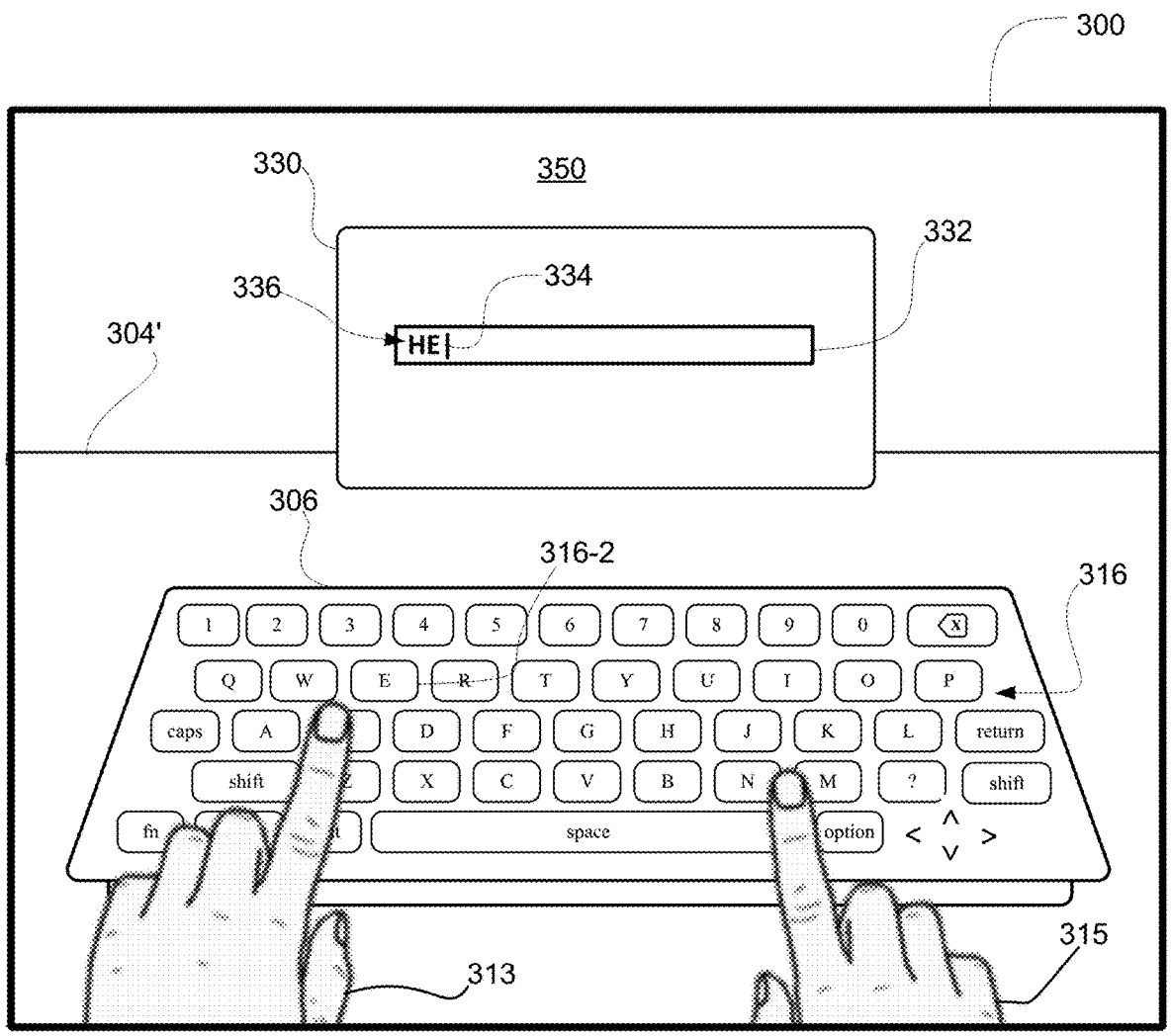
Figure 3H:
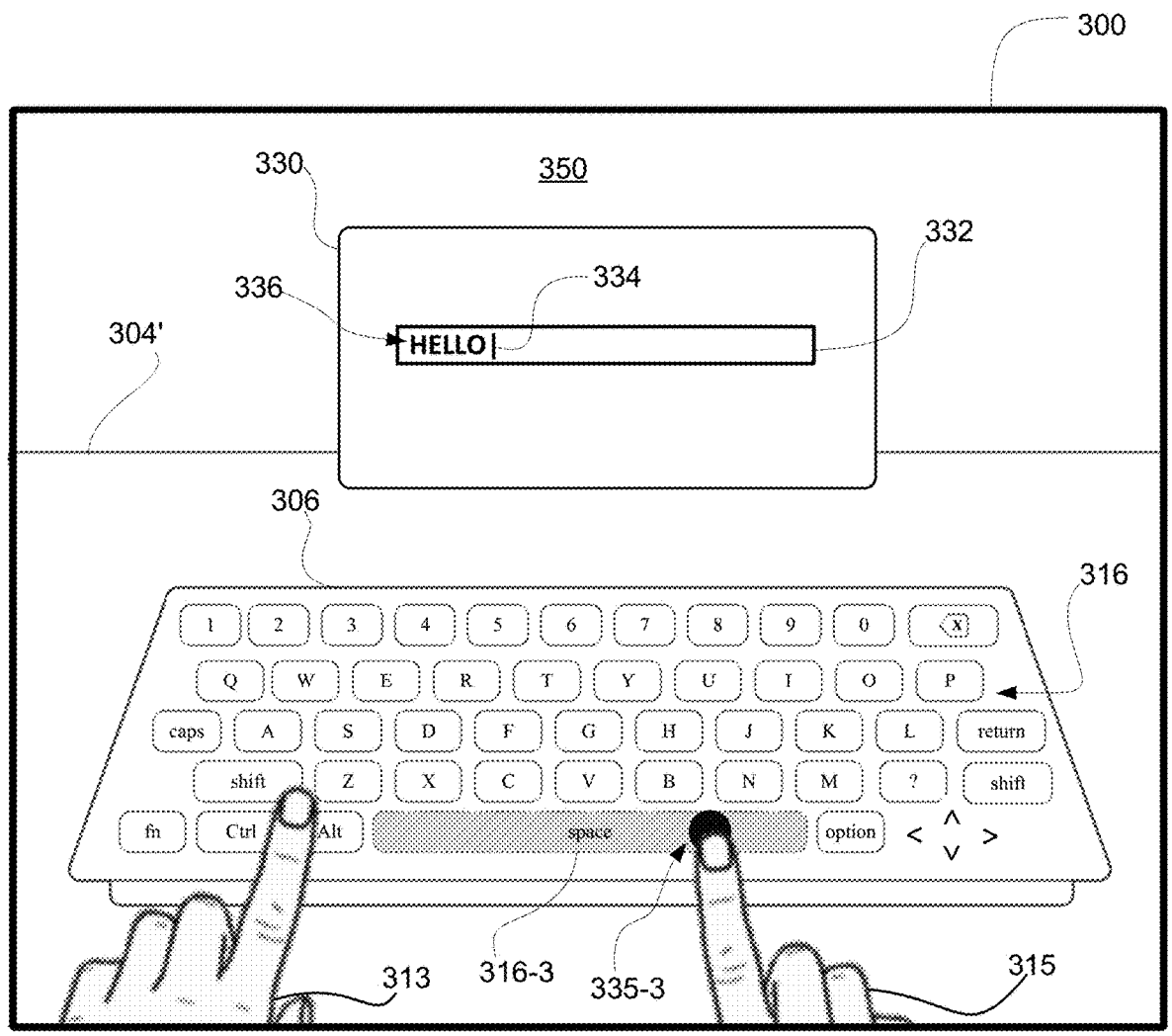

In some examples, as shown in FIG. 3G, the electronic device 300 determines that the contact provided by the finger of the first hand 313 of the user on the surface of the table 304' corresponds to a selection of the second key 316-2 of the virtual keyboard 306. For example, as similarly discussed above, the electronic device 300 determines that the location of the finger of the first hand 313 corresponds to (e.g., at least partially overlaps with) a location of the second key 316-2 of the virtual keyboard 306 on the surface of the table 304'. Further, in some examples, the electronic device 300 utilizes the one or more vibrations of the contact provided by the finger of the first hand 313 on the surface of the table 304' that are detected by the one or more laser light beams emitted by the remote sensing vibrometer to determine that the finger of the first hand 313 has contacted the surface of the table 304' and/or that locations of the one or more vibrations correspond to the location of the second key 316-2 of the virtual keyboard 306 on the surface of the table 304'. In some examples, in response to determining that the input provided by the first hand 313 of the user corresponds to a selection of the second key 316-2 of the virtual keyboard 306, the electronic device 300 enters a second character corresponding to the second key 316-2 in the text-entry field 332 of the application window 330. For example, as shown in FIG. 3G, the electronic device 300 updates display of the text 336 to include the character "E" that corresponds to the selected key 316-2 of the virtual keyboard 306 at the location of the cursor 334 in the text-entry region 332 in the application window 330. In some examples, the electronic device 300 may continue entering text into the text-entry field 332 of the application window 330 in response to detecting input from the hands 313 and/or 315 of the user directed to the keys 316 of the virtual keyboard 306 in the manner described above. For example, as shown in FIG. 3H, the electronic device 300 has updated the text 336 in the text-entry field 332 to include the additional characters "L," "L," and "O" which optionally spells out "HELLO" in response to detecting taps directed to the keys 316 of the virtual keyboard 306 on the surface of the table 304' that overlap with the keys corresponding to the letters "L" and "O" in the three-dimensional environment 350.

In some examples, it may be desirable to enter a space in the text 336 displayed in the text-entry field 332 to separate a first word from a second word in the text-entry field 332 (e.g., formed by the letters in the text-entry field 332) using the virtual keyboard 306 in the three-dimensional environment 350. In some examples, in FIG. 3H, the electronic device 300 detects an input corresponding to a request to select a third key 316-3 of the virtual keyboard 306 in the three-dimensional environment 350. For example, as shown in FIG. 3H, the electronic device 300 optionally detects movement of the second hand 315 toward the surface of the table 304' on which the virtual keyboard 306 is displayed in the three-dimensional environment 350. In some examples, the electronic device 300 detects a contact (e.g., a tap) on the surface of the table 304' provided by a finger of the second hand 315, as shown in FIG. 3H. For example, as similarly described above, the electronic device 300 detects one or more vibrations, represented by circle 335-3, in the surface of the table 304' (e.g., using the one or more laser light beams emitted by the remote sensing vibrometer) produced by the contact of the finger of the second hand 315 on the surface of the table 304'. In some examples, as discussed in more detail below, the electronic device 300 determines that the third key 316-3 of the virtual keyboard 306 has been selected based on the location of the second hand 315 relative to the virtual keyboard 306 and the locations of the one or more vibrations 335-3 produced by the contact of the finger of the second hand 315 on the surface of the table 304' in the three-dimensional environment 350.

Figure 3I:
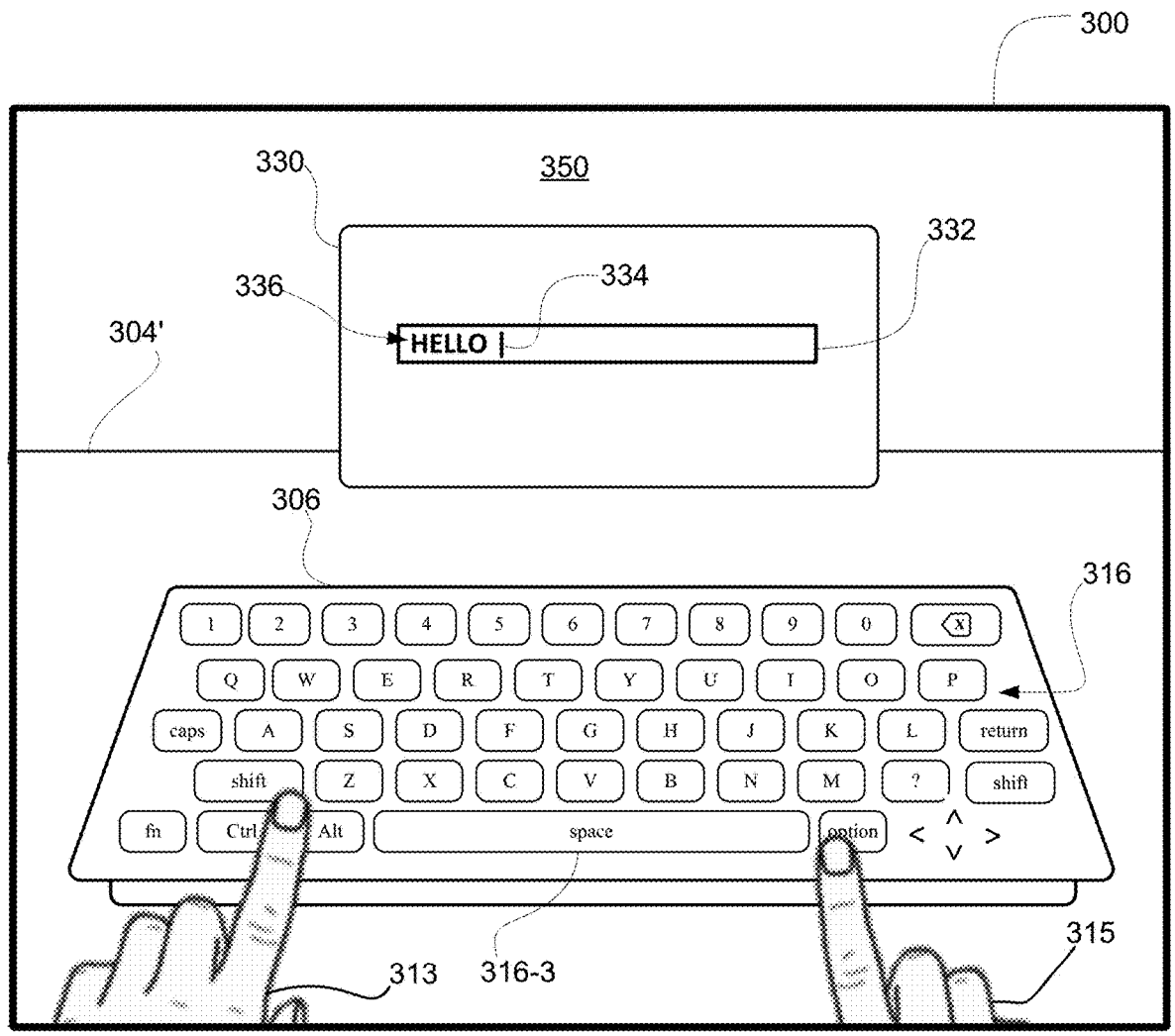

In some examples, as shown in FIG. 3I, the electronic device 300 determines that the contact provided by the finger of the second hand 315 of the user on the surface of the table 304' corresponds to a selection of the third key 316-3 of the virtual keyboard 306. For example, as similarly discussed above, the electronic device 300 determines that the location of the finger of the second hand 315 corresponds to (e.g., at least partially overlaps with) a location of the third key 316-3 of the virtual keyboard 306 on the surface of the table 304'. Further, in some examples, the electronic device 300 utilizes the one or more vibrations of the contact provided by the finger of the second hand 315 on the surface of the table 304' that are detected by the one or more laser light beams emitted by the remote sensing vibrometer to determine that the finger of the second hand 315 has contacted the surface of the table 304' and/or that locations of the one or more vibrations correspond to the location of the third key 316-3 of the virtual keyboard 306 on the surface of the table 304'. In some examples, in response to determining that the input provided by the second hand 315 of the user corresponds to a selection of the third key 316-3 of the virtual keyboard 306, the electronic device 300 enters a space in the text-entry field 332 of the application window 330. For example, as shown in FIG. 3I, the electronic device 300 updates display of the text 336 to include a space after the character "O" in response to detecting the selection of the key 316-3 of the virtual keyboard 306. As shown in FIG. 3I, the electronic device 300 enters the space at the location of the cursor 334 in the text-entry region 332 in the application window 330.

In some examples, as discussed above, the electronic device 300 may continue entering text into the text-entry field 332 of the application window 330 in response to detecting input from the hands 313 and/or 315 of the user directed to the keys 316 of the virtual keyboard 306 in the manner described above. For example, as shown in FIG. 3J, the electronic device 300 has updated the text 336 in the text-entry field 332 to include the additional characters "W," "O," R," "L," "D," and "D" which optionally spells out "HELLO WORLDD" in response to detecting taps directed to the keys 316 of the virtual keyboard 306 on the surface of the table 304' that overlap with the keys corresponding to the letters "W," "O," "R," "L," and "D" in the three-dimensional environment 350.

Figure 3J:
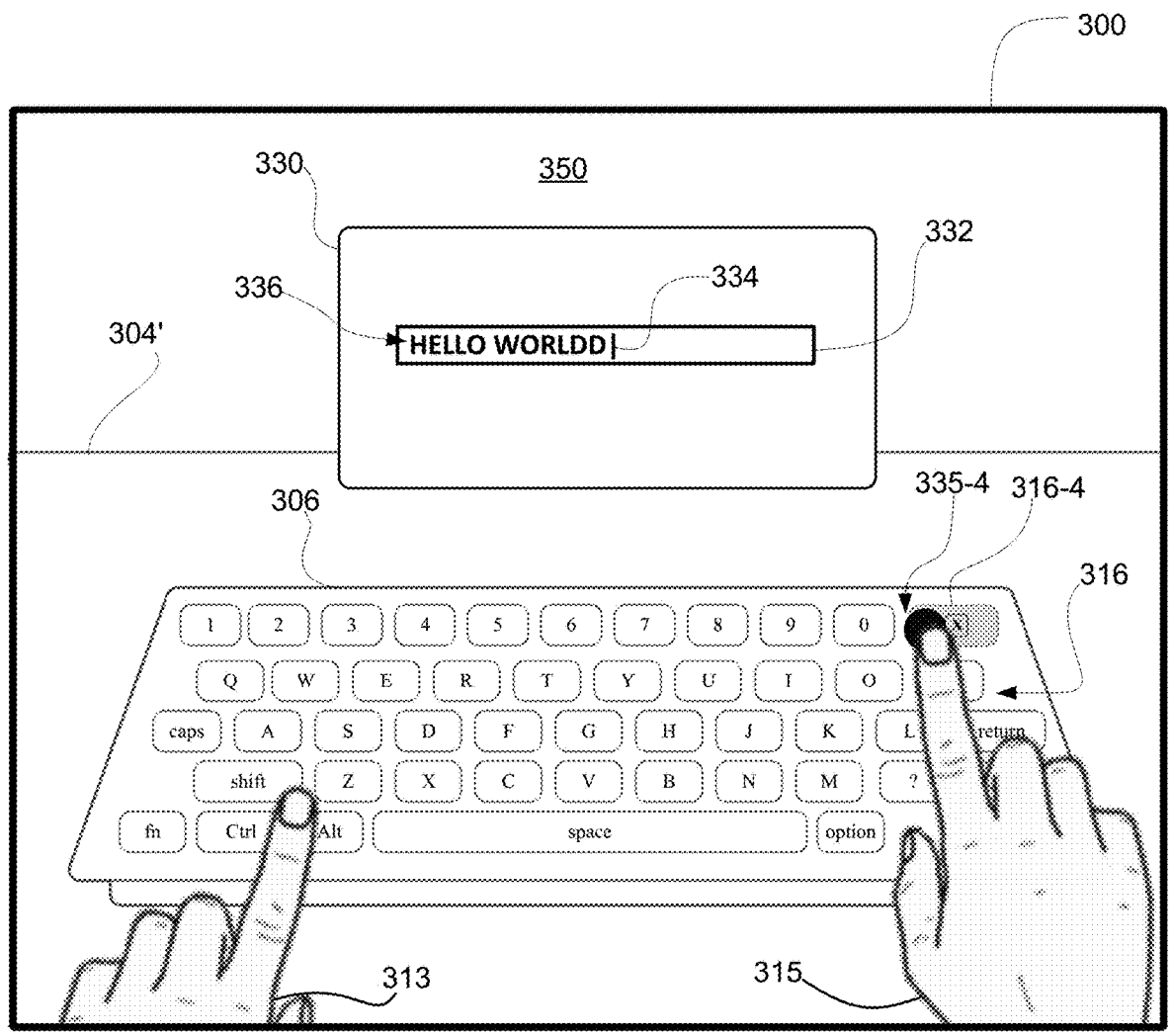

In some examples, it may be desirable to remove a character from the text 336 displayed in the text-entry field 332 of the application window 330 using the virtual keyboard 306 in the three-dimensional environment 350 (e.g., due to a misspelling of a word in the text-entry field 332, such as the misspelling of the word "world" in FIG. 3J). In some examples, in FIG. 3J, the electronic device 300 detects an input corresponding to a request to select a fourth key 316-4 of the virtual keyboard 306 in the three-dimensional environment 350. For example, as shown in FIG. 3J, the electronic device 300 optionally detects movement of the second hand 315 toward the surface of the table 304' on which the virtual keyboard 306 is displayed in the three-dimensional environment 350. In some examples, the electronic device 300 detects a contact (e.g., a tap) on the surface of the table 304' provided by a finger of the second hand 315, as shown in FIG. 3J. For example, as similarly described above, the electronic device 300 detects one or more vibrations, represented by circle 335-4, in the surface of the table 304' (e.g., using the one or more laser light beams emitted by the remote sensing vibrometer) produced by the contact of the finger of the second hand 315 on the surface of the table 304'. In some examples, as discussed in more detail below, the electronic device 300 determines that the fourth key 316-4 of the virtual keyboard 306 has been selected based on the location of the first hand 313 relative to the virtual keyboard 306 and the locations of the one or more vibrations 335-4 produced by the contact of the finger of the second hand 315 on the surface of the table 304' in the three-dimensional environment 350.

Figure 3K:
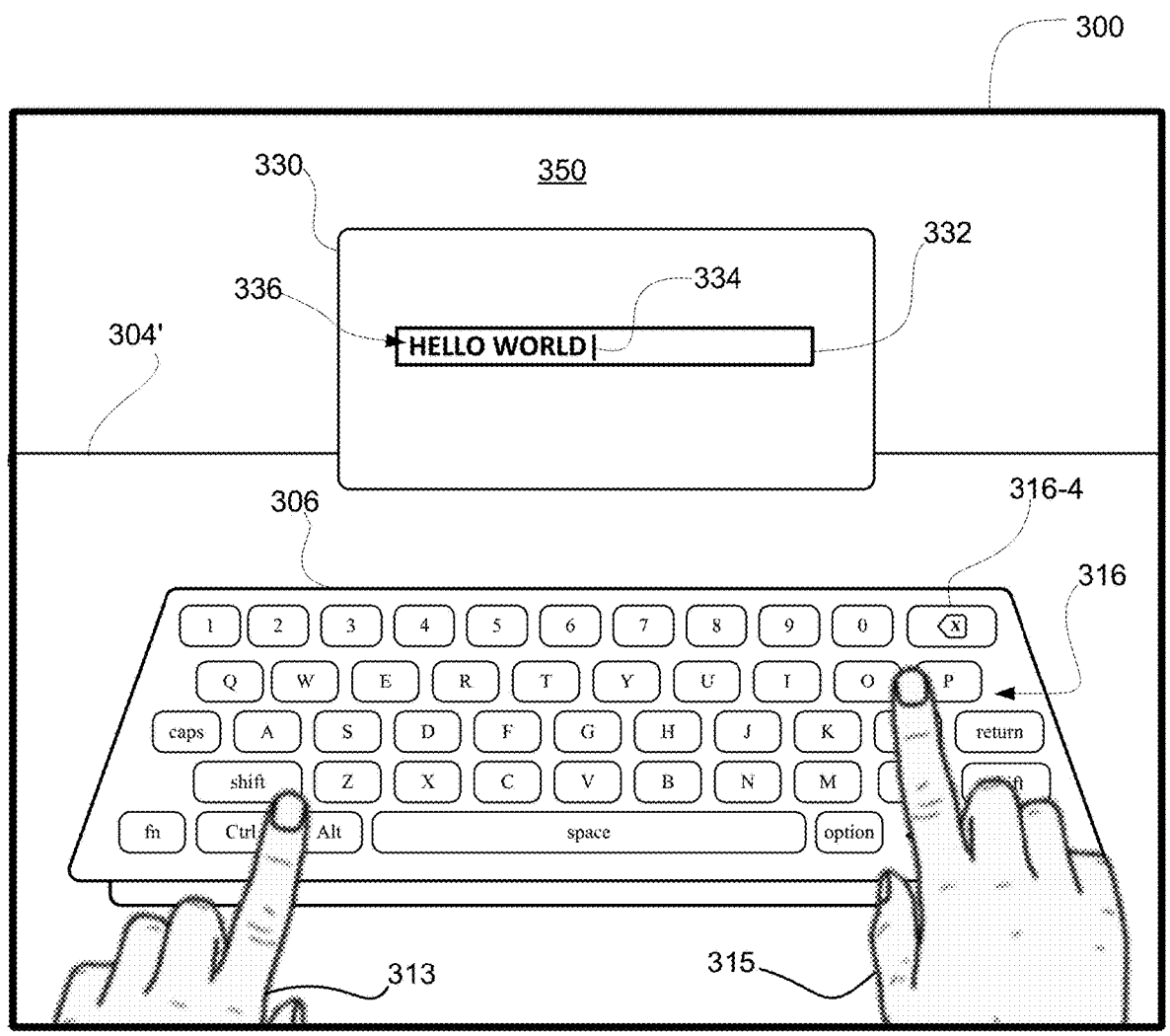

In some examples, as shown in FIG. 3K, the electronic device 300 determines that the contact provided by the finger of the second hand 315 of the user on the surface of the table 304' corresponds to a selection of the fourth key 316-4 of the virtual keyboard 306. For example, as similarly discussed above, the electronic device 300 determines that the location of the finger of the second hand 315 corresponds to (e.g., at least partially overlaps with) a location of the fourth key 316-4 of the virtual keyboard 306 on the surface of the table 304'. Further, in some examples, the electronic device 300 utilizes the one or more vibrations of the contact provided by the finger of the second hand 315 on the surface of the table 304' that are detected by the one or more laser light beams emitted by the remote sensing vibrometer to determine that the finger of the second hand 315 has contacted the surface of the table 304' and/or that locations of the one or more vibrations correspond to the location of the fourth key 316-4 of the virtual keyboard 306 on the surface of the table 304'. In some examples, in response to determining that the input provided by the second hand 315 of the user corresponds to a selection of the fourth key 316-4 of the virtual keyboard 306, the electronic device 300 performs a deletion in the text-entry field 332 of the application window 330. For example, as shown in FIG. 3K, the electronic device 300 updates display of the text 336 to no longer include the character "D" in response to detecting the selection of the key 316-4 of the virtual keyboard 306. As shown in FIG. 3K, the electronic device 300 removes the character "D" preceding the cursor 334 in the text-entry region 332 in the application window 330, such that the text 336 now includes the correct spelling of the word "WORLD" as shown.

As described above, the electronic device 300 may enter text into the text-entry field 332 in response to detecting selection of one or more keys 316 of the virtual keyboard 306 based on the locations of the hands 313 and/or 315 of the user and/or contact with the surface of the table 304' in the three-dimensional environment 350. In some examples, the electronic device 300 forgoes detecting selection of one or more keys 316 of the virtual keyboard 306 in accordance with a determination that input provided by the hands 313 and/or 315 of the user is not directed to at least one key of the virtual keyboard 306. For example, the electronic device 300 forgoes detecting selection of a key of the virtual keyboard 306 if the electronic device 300 determines that the hands 313 and/or 315 of the user are not positioned on and/or above the portion of the table 304' on which the virtual keyboard 306 is displayed (e.g., the fingers of the first hand 313 and/or the second hand 315 are not located above any keys of the virtual keyboard 306). Additionally, in some examples, the electronic device 300 forgoes detecting selection of a key of the virtual keyboard 306 if the electronic device 300 determines that contact detected on the surface of the table 304' provided by the hands 313 and/or 315 of the user does not correspond to (e.g., overlap with) a location of at least one key of the virtual keyboard 306. For example, as described in more detail below, the electronic device 300 forgoes detecting selection of a key of the virtual keyboard 306 if the electronic device 300 determines that one or more vibrations produced by the contact of a finger of the first hand 313 or the second hand 315 are not located at or near (e.g., a threshold distance of, such as 0.5, 1, 1.5, 2, 3, 4, etc. cm) at least one key of the virtual keyboard 306.

Figure 3L:
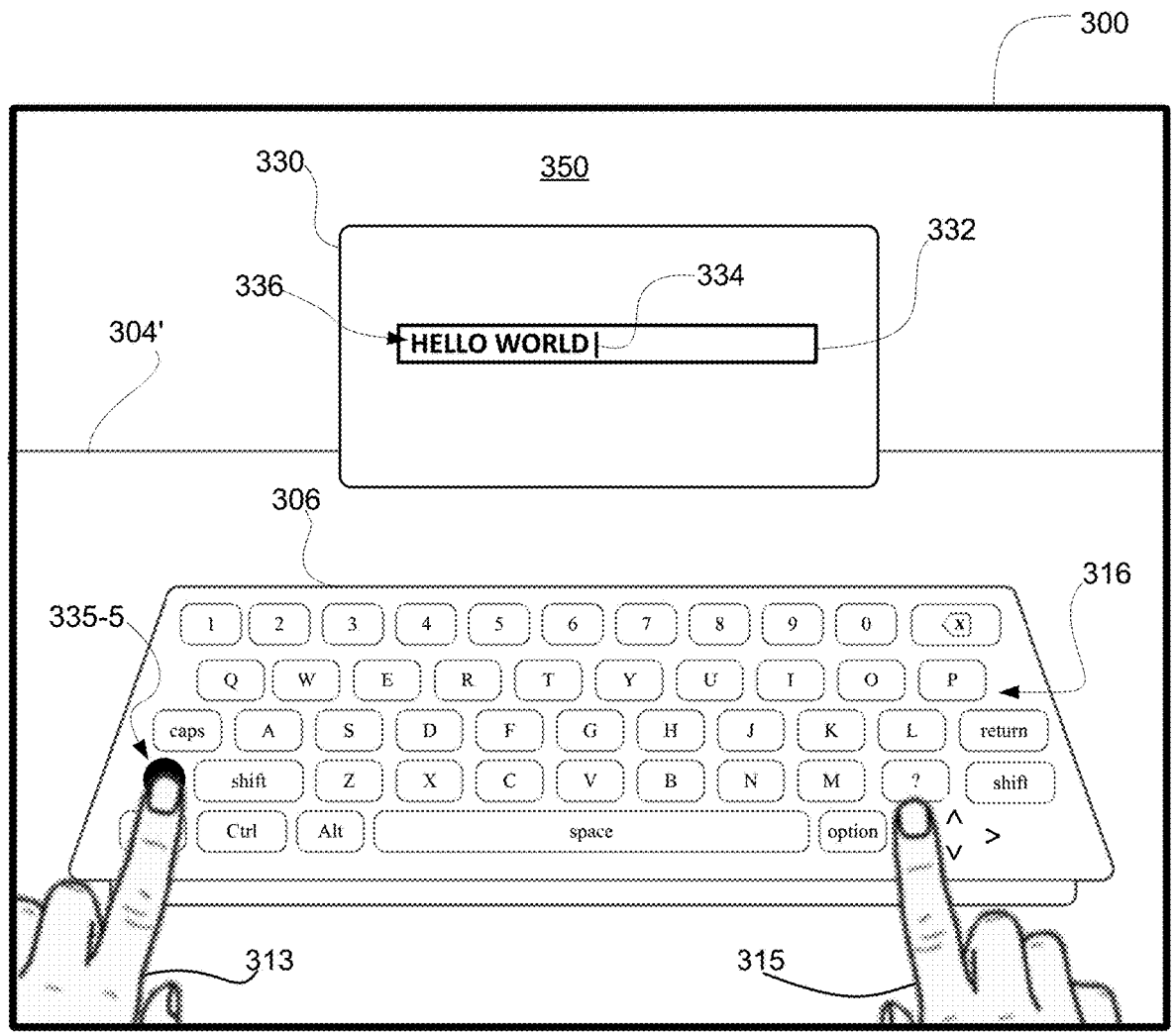

In FIG. 3L, the electronic device 300 may detect an input provided by the first hand 313 of the user. For example, as shown in FIG. 3L, the electronic device 300 detects the first hand 313 of the user move toward the surface of the table 304' on which the virtual keyboard 306 is displayed and contact (e.g., provide a tap on) the surface of the table 304'. In some examples, as shown in FIG. 3L and as similarly described above, the electronic device 300 utilizes images captured via the camera in communication with the electronic device 300 to track a location of the hand 313 of the user relative to the keys 316 of the virtual keyboard 306. When a finger of the first hand 313 contacts the surface of the table 304', the electronic device 300 optionally determines that a location of the finger relative to the keys 316 of the virtual keyboard 306 does not correspond to (e.g., overlap with) at least one key of the virtual keyboard 306, as shown in FIG. 3L. Additionally, as described above, in some examples, when the finger of the first hand 313 contacts the surface of the table 304', one or more vibrations, represented by circle 335-5, are generated in the surface of the table 304' that are detected using the one or more light beams of the remote sensing vibrometer in communication with the electronic device 300. In some examples, as shown in FIG. 3L, the electronic device 300 determines that a location at which the one or more vibrations 335-5 produced by the contact of the finger of the first hand 313 is detected does not correspond to (e.g., overlap with) a location of at least one key of the virtual keyboard 306. Additionally or alternatively, in some examples, in FIG. 3L, the electronic device 300 determines that the detected location of the one or more vibrations 335-5 in the surface of the table 304' is not within a threshold distance of, such as 0.5, 1, 1.5, 2, 3, 4, etc. cm of, at least one key of the virtual keyboard 306.

Figure 3M:
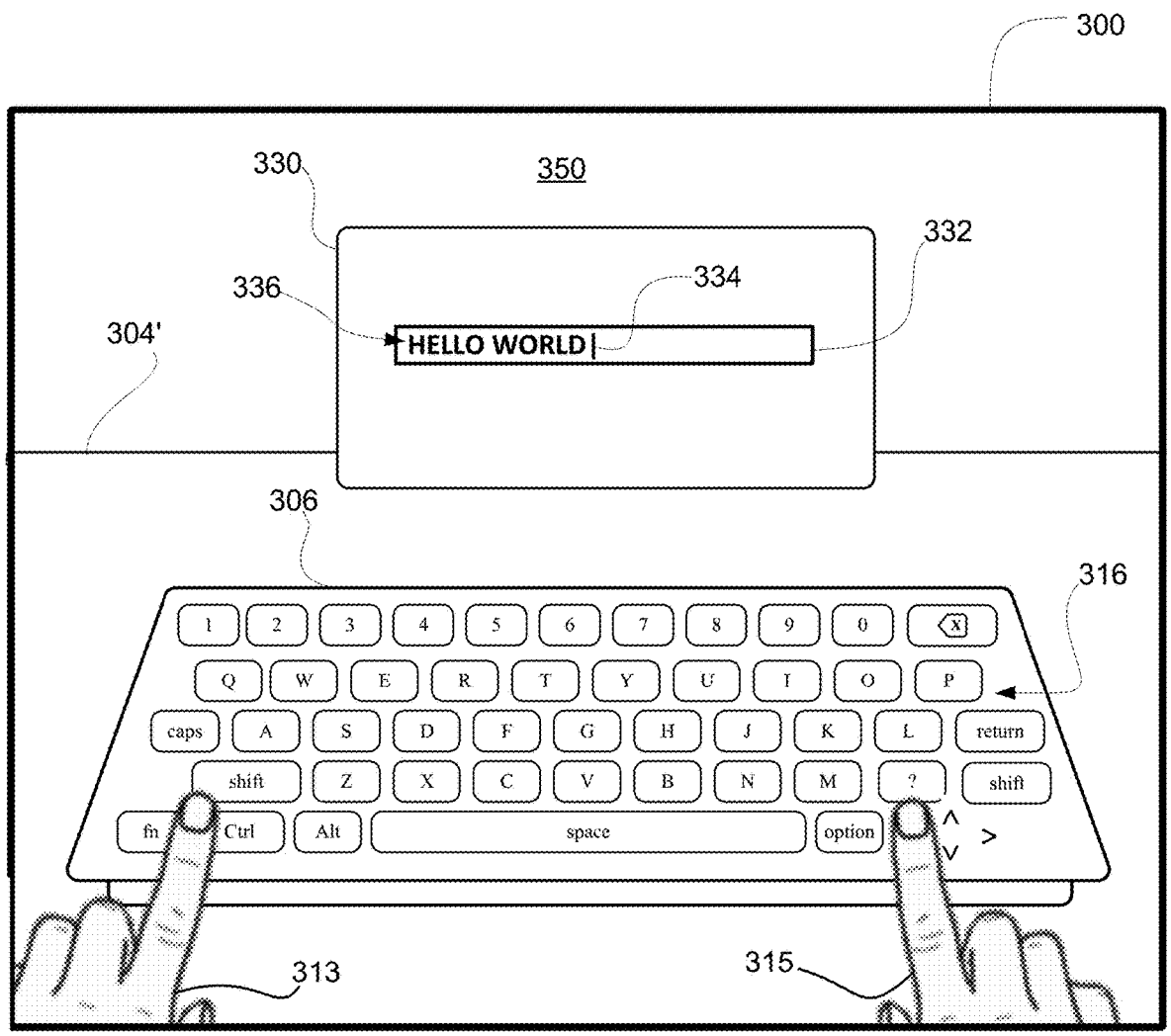

In some examples, in FIG. 3M, in accordance with the determination that the input provided by the first hand 313 of the user does not correspond to a selection of at least one key of the virtual keyboard 306 as discussed above, the electronic device 300 forgoes performing selection of any keys 316 of the virtual keyboard 306 in the three-dimensional environment 350. For example, as shown in FIG. 3M, the electronic device 300 forgoes updating display of the text 336 displayed in the text-entry field 332 of the application window 330. As shown in FIG. 3M, the electronic device 300 optionally maintains display of the words "HELLO WORLD" in the text-entry field 332 without entering additional characters (e.g., letters, numbers, punctuation marks, etc.), entering a space at the location of the cursor 334, and/or deleting a character from the text 336 (e.g., because the electronic device 300 does not perform the selection operation directed to the keys of the virtual keyboard 306).

It is understood that the examples shown and described herein are merely exemplary and that additional and/or alternative elements may be provided within the three-dimensional environment for interacting with the virtual image. It should be understood that the appearance, shape, form and size of each of the various user interface elements and objects shown and described herein are exemplary and that alternative appearances, shapes, forms and/or sizes may be provided. For example, the virtual keyboard (e.g., virtual keyboard 306) may be provided in an alternative shape than a rectangular shape, such as a circular shape, triangular shape, etc. Additionally, although the virtual image (e.g., virtual image 306) is primarily described herein as corresponding to a virtual keyboard, it should be understood that other virtual images are possible, such as user interfaces (e.g., similar to the user interface of application window 330), three-dimensional games, three-dimensional content (e.g., images, video, etc.), and/or other virtual input devices, such as a virtual trackpad/mouse. In some such examples, the electronic device 300 may be configurable to detect input (e.g., selection input, such as a tap) directed to the other virtual images in a similar manner as described above, namely utilizing the camera and/or the remote sensing vibrometer that are in communication with the electronic device 300.

Additionally, it should be understood that while the examples shown and described herein refer to input provided by a finger of a hand of the user of the electronic device 300, additional or alternative objects may be utilized to provide input directed to a virtual image (e.g., the virtual keyboard 306). For example, a physical object, such as a pen, pencil, stylus, or other object may be utilized by the user to provide a tap on the surface of the table 304' on which the virtual keyboard 306 is displayed. In some such examples, the electronic device 300 may be configurable to track the location of the physical object (e.g., using the camera) relative to the keys 316 of the virtual keyboard 306, and may detect one or more vibrations in the surface of the table 304' (e.g., using the one or more light beams emitted by the remote sensing vibrometer) produced by the contact of the physical object on the surface of the virtual keyboard 306. Additionally, while the inputs shown in FIGS. 3A-3M are described herein as being detected sequentially, it should be understood that, in some examples, the inputs may be detected concurrently. For example, the electronic device 300 may concurrently detects contacts provided by the first hand 313 and the second hand 315 of the user (e.g., in a similar manner as described above), such as a first finger of the first hand 313 and a first finger of the second hand 315 for entering a special character in the text-entry field 332 (e.g., concurrently selecting a "shift" key and a second key of the virtual keyboard 306). Further, while the inputs shown in FIGS. 3A-3M are described herein as including taps that are directed to the physical surface (e.g., table 304') on which the virtual keyboard 306 is displayed, in some examples, the inputs may additionally or alternatively include swiping/dragging gestures. For example, using the methods discussed above, the electronic device 300 may detect a contact (e.g., of a finger of the user) on the surface of the table 304' followed by movement of the contact (e.g., in a respective direction) along the surface of the table 304'. In some such examples, the detected swiping/dragging gesture may be utilized to provide input to a virtual input device, such as a virtual trackpad or a virtual display, for controlling an interaction point (e.g., a cursor).

Figure 4:
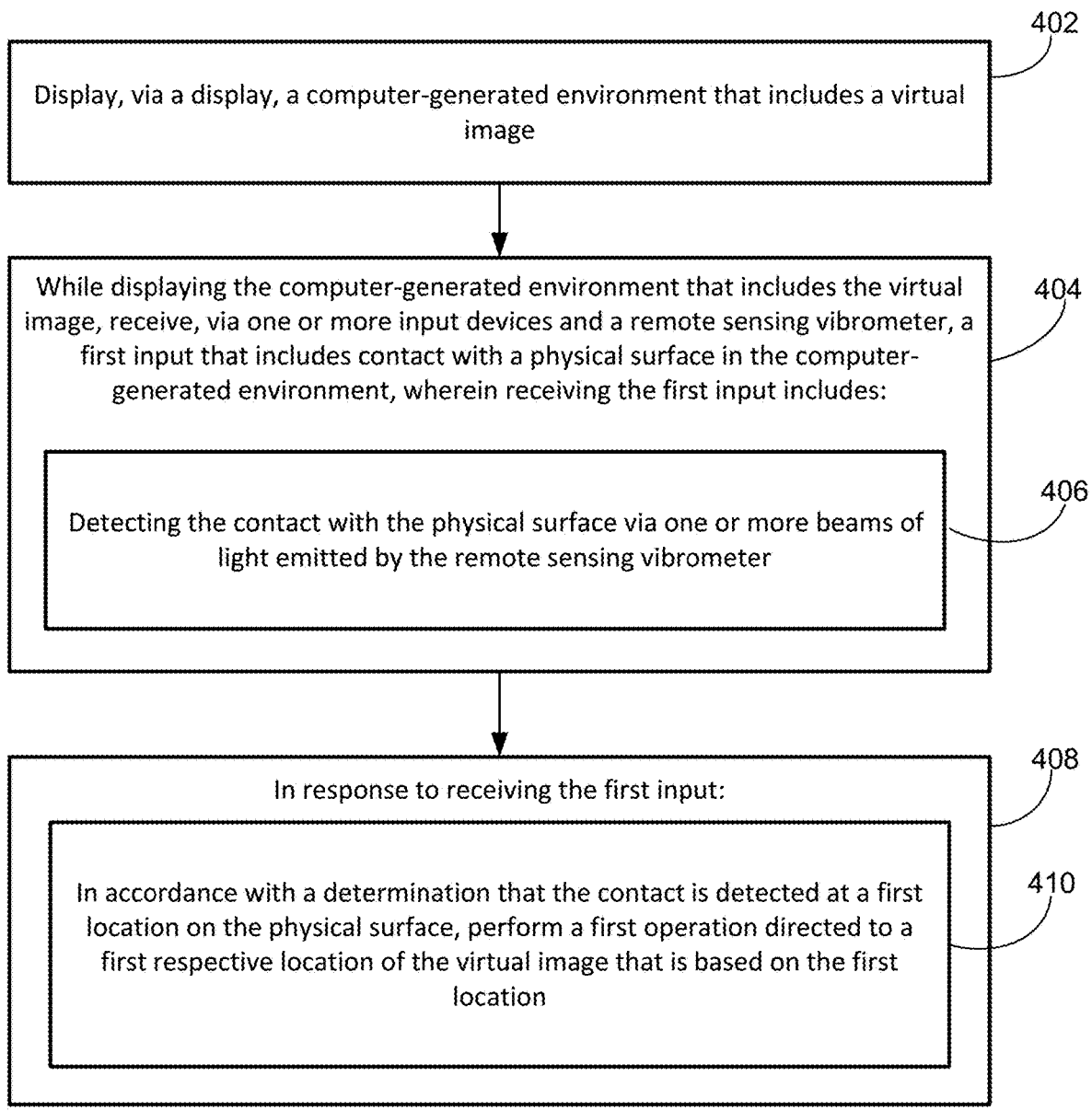
FIG. 4 illustrates a flow diagram illustrating an example process for tap detection on a virtual image in a three-dimensional computer-generated environment according to some examples of the disclosure.

FIG. 4 illustrates a flow diagram illustrating an example process for tap detection on a virtual image in a three-dimensional computer-generated environment according to some examples of the disclosure. In some examples, process 400 begins at an electronic device in communication with a display, one or more input devices, and a remote sensing vibrometer. In some examples, the electronic device is optionally a head-mounted display similar or corresponding to device 201 of FIG. 2. In some examples, the remote sensing vibrometer is similar or corresponds to device 221 of FIG. 2. In some examples, one or more processors of the electronic device includes an N-number of data channels (e.g., through which data (e.g., input data) is received from the remote sensing vibrometer). In some examples, the one or more processors are configurable to filter noise and motion in an environment surrounding the electronic device (and the remote sensing vibrometer).

In some examples, at 402, the electronic device displays, via the display, a computer-generated environment that includes a virtual image. For example, as shown in FIG. 3A, the electronic device 300 displays three-dimensional environment 350 that includes virtual keyboard 306 that is displayed on a physical surface of table 304'. As described previously above with reference to FIG. 3A, the virtual keyboard 306 may include a plurality of selectable keys 316. In some examples, at 404, while displaying the computer-generated environment that includes the virtual image, the electronic device receives, via the one or more input devices and the remote sensing vibrometer, a first input that includes contact with a physical surface in the computer-generated environment, wherein receiving the first input includes, at 406, detecting the contact with the physical surface via one or more beams of light emitted by the remote sensing vibrometer. For example, as shown in FIG. 3D, the electronic device 300 detects a contact of hand 315 of a user of the electronic device 300 on the physical surface of the table 304' in the three-dimensional environment 350. As described with reference to FIG. 3D, the contact of the hand 315 on the physical surface may produce one or more vibrations (e.g., represented by circle 335-1 in FIG. 3D) in the physical surface of the table 304' that are detected via the one or more beams of light emitted by the remote sensing vibrometer.

In some examples, when the remote sensing vibrometer detects the one or more vibrations produced by the contact on the physical surface, the remote sensing vibrometer may stream data corresponding to the contact to the electronic device. For example, the one or more processors of the electronic device may receive the data via the N-channels of the one or more channels. In some examples, the one or more processors perform triangulation using the data streamed via the N-channels to estimate a location of the contact on the physical surface. In some examples, the one or more processors perform location-based FAR filtering on the location estimate. In some examples, the filtering produces a tap confidence value, a position estimate on the physical surface, and/or a tap force value. In some examples, the tap confidence value controls whether the electronic device determines that a tap input is detected on the physical surface (e.g., above a threshold, such as above 70, 75, 80, 85, 90, etc. %). In some examples, the tap force value corresponds to a magnitude of the contact on the physical surface. In some examples, the electronic device utilizes the tap force value to evaluate whether to perform a particular operation involving the virtual image (e.g., the virtual keyboard 306). For example, if the tap force value is a first threshold value, the electronic device performs a first operation directed to the virtual keyboard (e.g., selecting a virtual key and inputting a lowercase character in a text-entry field). If the tap force value is a second threshold value, greater than the first threshold value, the electronic device performs a second operation directed to the virtual keyboard (e.g., selecting a virtual key and inputting an uppercase character in a text-entry field).

In some examples, as similarly described above, the one or more input devices include a camera (e.g., a camera of the electronic device). In some examples, the electronic device captures one or more images of an object providing the contact on the physical surface using the camera, such as the hand of the user providing the contact on the physical surface. In some examples, as previously described above, the one or more processors of the electronic device are configurable to track the location of the object providing the contact on the surface relative to the virtual image (e.g., the virtual keyboard) in the computer-generated environment.

In some examples, at 408, in response to receiving the first input, at 410, in accordance with a determination that the contact is detected at a first location on the physical surface, the electronic device performs a first operation directed to a first respective location of the virtual image that is based on the first location. For example, in FIG. 3D, the electronic device 300 determines that the contact of the hand 315 is detected at a first location on the physical surface of the table 304' that corresponds to a location of virtual key 316-1 of the virtual keyboard 306. As described with reference to FIG. 3E, the electronic device 300 may perform a selection of the virtual key 316-1, which optionally includes entering text 336 (e.g., including the character "H") into text-entry field 332 of application window 330 in the three-dimensional environment 350.

In some examples, the one or more processors of the electronic device utilizes the tap confidence value, the position estimate, and/or the tap force value described above to determine that the first location on the physical surface corresponds to the first respective location of the virtual image. In some examples, the one or more processors of the electronic device also utilize the tracked location of the object (e.g., hand of the user) providing the contact on the physical surface relative to the virtual image to determine that the first location on the physical surface corresponds to the first respective location of the virtual image. For example, the one or more processors are configurable to perform spatiotemporal filtering on the detected tap data from the remote sensing vibrometer and the tracked image data from the camera to determine that the first location on the physical surface corresponds to the first respective location of the virtual image. In some examples, following the spatiotemporal filtering, the one or more processors cause the electronic device to perform a particular operation, such as a selection operation directed to the virtual image, as described above.

It is understood that process 400 is an example and that more, fewer, or different operations can be performed in the same or in a different order. Additionally, the operations in process 400 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at an electronic device in communication with a display, one or more input devices, and a remote sensing vibrometer: displaying, via the display, a computer-generated environment that includes a virtual image; while displaying the computer-generated environment that includes the virtual image, receiving, via the one or more input devices and the remote sensing vibrometer, a first input that includes contact with a physical surface in the computer-generated environment, wherein receiving the first input includes detecting the contact with the physical surface via one or more beams of light emitted by the remote sensing vibrometer; and in response to receiving the first input, performing a first operation directed to a first respective location of the virtual image that is based on a first location on the physical surface when the contact is detected at the first location.

Additionally or alternatively, in some examples, the electronic device is a head-mounted display. Additionally or alternatively, in some examples, the remote sensing vibrometer is integrated with the head-mounted display. Additionally or alternatively, in some examples, the method further comprises, in response to receiving the first input, performing the first operation directed to a second respective location, different from the first respective location, of the virtual image that is based on a second location, different from the first location, on the physical surface when the contact is detected at the second location. Additionally or alternatively, in some examples, the contact is provided by a finger of a hand of a user of the electronic device. Additionally or alternatively, in some examples, the one or more input devices include a camera and receiving the first input includes detecting, via the camera, a location of the finger of the hand of the user relative to the virtual image displayed on the physical surface in the computer-generated environment. Additionally or alternatively, in some examples, detecting the contact with the physical surface via the one or more beams of light emitted by the remote sensing vibrometer includes detecting one or more vibrations on the physical surface via one or more reflections of the one or more beams of light.

Additionally or alternatively, in some examples, the virtual image is a virtual keyboard that is displayed on the physical surface in the computer-generated environment. Additionally or alternatively, in some examples, the first respective location of the virtual image corresponds to a first key of the virtual keyboard. Additionally or alternatively, in some examples, performing the first operation includes performing a selection of the first key of the virtual keyboard. Additionally or alternatively, in some examples, the method further comprises forgoing performing the first operation directed to a second respective location of the virtual image that is based on a second location on the physical surface that does not correspond to a respective key of the virtual keyboard when the contact is detected at the second location. Additionally or alternatively, in some examples, the remote sensing vibrometer includes a coherent laser light source. Additionally or alternatively, in some examples, the one or more beams of light emitted by the remote sensing vibrometer correspond to one or more laser beams emitted by the coherent laser light source. Additionally or alternatively, in some examples, the computer-generated environment includes a virtual text-entry field. Additionally or alternatively, in some examples, the first respective location of the virtual image corresponds to a first key of a virtual keyboard that is displayed on the physical surface and performing the first operation includes displaying a first character corresponding to the first key of the virtual keyboard in the virtual text-entry field.

Additionally or alternatively, in some examples, the first respective location of the virtual image corresponds to a first key of a virtual keyboard that is displayed on the physical surface and performing the first operation includes removing a first character from the virtual text-entry field. Additionally or alternatively, in some examples, the first respective location of the virtual image corresponds to a first key of a virtual keyboard that is displayed on the physical surface and performing the first operation includes entering a space within the virtual text-entry field. Additionally or alternatively, in some examples, detecting the contact with the physical surface includes detecting the contact with the physical surface with a first magnitude. In some examples, the method further comprises: receiving, via the one or more input devices and the remote sensing vibrometer, a second input that includes contact with the physical surface with a second magnitude, greater than the first magnitude, in the computer-generated environment; and in response to receiving the second input, performing a second operation, different from the first operation, directed to a second respective location, different from the first respective location, of the virtual image that is based on a second location, different from the first location, on the physical surface when the contact is detected at the second location.

Some examples of the disclosure are directed to an electronic device, comprising one or more processors, memory, and one or more programs, wherein the one or more programs are stored in the memory and configured to be executed by the one or more processors, the one or more programs including instructions for: displaying, via a display, a computer-generated environment that includes a virtual image; while displaying the computer-generated environment that includes the virtual image, receiving, via one or more input devices and a remote sensing vibrometer, a first input that includes contact with a physical surface in the computer-generated environment, wherein receiving the first input includes detecting the contact with the physical surface via one or more beams of light emitted by the remote sensing vibrometer; and in response to receiving the first input, performing a first operation directed to a first respective location of the virtual image that is based on a first location on the physical surface when the contact is detected at the first location.

Some examples of the disclosure are directed to a non-transitory computer readable storage medium storing one or more programs, the one or more programs comprising instructions, which when executed by one or more processors of an electronic device, cause the electronic device to perform a method comprising: displaying, via a display, a computer-generated environment that includes a virtual image; while displaying the computer-generated environment that includes the virtual image, receiving, via one or more input devices and a remote sensing vibrometer, a first input that includes contact with a physical surface in the computer-generated environment, wherein receiving the first input includes detecting the contact with the physical surface via one or more beams of light emitted by the remote sensing vibrometer; and in response to receiving the first input, performing a first operation directed to a first respective location of the virtual image that is based on a first location on the physical surface when the contact is detected at the first location.

Some examples of the disclosure are directed to an electronic device, comprising: one or more processors; memory; and one or more programs, wherein the one or more programs are stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising: one or more processors; memory; and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
   at an electronic device in communication with a display and a remote sensing vibrometer:
      displaying, via the display, a three-dimensional environment that includes a virtual image;
      while displaying the three-dimensional environment that includes the virtual image, receiving, via the remote sensing vibrometer, a first input that includes contact with a physical surface in the three-dimensional environment, wherein receiving the first input includes:
         detecting the contact with the physical surface via one or more beams of light emitted by the remote sensing vibrometer; and
      in response to receiving the first input:
         performing a first operation directed to a first respective location of the virtual image that is based on a first location on the physical surface when the contact is detected at the first location.

2. The method of claim 1, wherein the electronic device is a head-mounted display.

3. The method of claim 2, wherein the remote sensing vibrometer is integrated with the head-mounted display.

4. The method of claim 1, further comprising:
   in response to receiving the first input:
      performing the first operation directed to a second respective location, different from the first respective location, of the virtual image that is based on a second location, different from the first location, on the physical surface when the contact is detected at the second location.

5. The method of claim 1, wherein the contact is provided by a finger of a hand of a user of the electronic device.

6. The method of claim 5, wherein:
   the electronic device is in communication with one or more input devices including a camera; and
   receiving the first input includes detecting, via the camera, a location of the finger of the hand of the user relative to the virtual image displayed on the physical surface in the three-dimensional environment.

7. The method of claim 1, wherein detecting the contact with the physical surface via the one or more beams of light emitted by the remote sensing vibrometer includes detecting one or more vibrations on the physical surface via one or more reflections of the one or more beams of light.

8. The method of claim 1, wherein the virtual image is a virtual keyboard that is displayed on the physical surface in the three-dimensional environment.

9. The method of claim 8, wherein the first respective location of the virtual image corresponds to a first key of the virtual keyboard.

10. The method of claim 9, wherein performing the first operation includes performing a selection of the first key of the virtual keyboard.

11. The method of claim 8, further comprising:
    forgoing performing the first operation directed to a second respective location of the virtual image that is based on a second location on the physical surface that does not correspond to a respective key of the virtual keyboard when the contact is detected at the second location.

12. The method of claim 1, wherein the remote sensing vibrometer includes a coherent laser light source.

13. The method of claim 12, wherein the one or more beams of light emitted by the remote sensing vibrometer correspond to one or more laser beams emitted by the coherent laser light source.

14. The method of claim 1, wherein the three-dimensional environment includes a virtual text-entry field.

15. The method of claim 14, wherein:
    the first respective location of the virtual image corresponds to a first key of a virtual keyboard that is displayed on the physical surface; and
    performing the first operation includes displaying a first character corresponding to the first key of the virtual keyboard in the virtual text-entry field.

16. The method of claim 15, wherein:
    the first respective location of the virtual image corresponds to a first key of a virtual keyboard that is displayed on the physical surface; and
    performing the first operation includes removing a first character from the virtual text-entry field.

17. The method of claim 15, wherein:
    the first respective location of the virtual image corresponds to a first key of a virtual keyboard that is displayed on the physical surface; and
    performing the first operation includes entering a space within the virtual text-entry field.

18. The method of claim 1, wherein detecting the contact with the physical surface includes detecting the contact with the physical surface with a first magnitude, the method further comprising:
    receiving, via the remote sensing vibrometer, a second input that includes contact with the physical surface with a second magnitude, greater than the first magnitude, in the three-dimensional environment; and
    in response to receiving the second input:
       performing a second operation, different from the first operation, directed to a second respective location, different from the first respective location, of the virtual image that is based on a second location on the physical surface when the contact is detected at the second location.

19. An electronic device, comprising:
one or more processors;
memory; and
one or more programs, wherein the one or more programs are stored in the memory and configured to be executed by the one or more processors, the one or more programs including instructions for:
 displaying, via a display, a three-dimensional environment that includes a virtual image;
 while displaying the three-dimensional environment that includes the virtual image, receiving, via a remote sensing vibrometer, a first input that includes contact with a physical surface in the three-dimensional environment, wherein receiving the first input includes:
  detecting the contact with the physical surface via one or more beams of light emitted by the remote sensing vibrometer; and
 in response to receiving the first input:
  performing a first operation directed to a first respective location of the virtual image that is based on a first location on the physical surface when the contact is detected at the first location.

20. A non-transitory computer readable storage medium storing one or more programs, the one or more programs comprising instructions, which when executed by one or more processors of an electronic device, cause the electronic device to perform a method comprising:
 displaying, via a display, a three-dimensional environment that includes a virtual image;
 while displaying the three-dimensional environment that includes the virtual image, receiving, via a remote sensing vibrometer, a first input that includes contact with a physical surface in the three-dimensional environment, wherein receiving the first input includes:
  detecting the contact with the physical surface via one or more beams of light emitted by the remote sensing vibrometer; and
 in response to receiving the first input:
 performing a first operation directed to a first respective location of the virtual image that is based on a first location on the physical surface when the contact is detected at the first location.

* * * * *